(12) United States Patent
Tanigawa

(10) Patent No.: US 10,793,389 B2
(45) Date of Patent: Oct. 6, 2020

(54) IMAGE PROCESSING DEVICE WITH A FOLD UNIT FOR FOLDING A POSITION ADJUSTMENT SHEET AND METHOD THEREFOR

(71) Applicant: FUJI XEROX CO., LTD., Tokyo (JP)

(72) Inventor: Tomohiro Tanigawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 200 days.

(21) Appl. No.: 15/943,946

(22) Filed: Apr. 3, 2018

(65) Prior Publication Data

US 2019/0071274 A1    Mar. 7, 2019

(30) Foreign Application Priority Data

Sep. 6, 2017    (JP) ................................ 2017-171112

(51) Int. Cl.
| | |
|---|---|
| *B65H 45/12* | (2006.01) |
| *H04N 1/00* | (2006.01) |
| *B41J 13/02* | (2006.01) |
| *G03G 15/08* | (2006.01) |

(Continued)

(52) U.S. Cl.
CPC ........... *B65H 45/12* (2013.01); *B31F 1/0022* (2013.01); *B41J 13/02* (2013.01); *B65H 43/00* (2013.01);

(Continued)

(58) Field of Classification Search
CPC ........ B65H 45/12; B65H 45/30; B65H 43/00; B65H 37/06; B65H 43/08; G03G 15/5062;

(Continued)

(56) References Cited

U.S. PATENT DOCUMENTS 5,288,015 A * 2/1994 Sauerwine ............. B42D 5/026
    229/300
7,896,328 B2 * 3/2011 Kawamura ........ G03G 15/6538
    270/32

(Continued)

FOREIGN PATENT DOCUMENTS

| JP | 2012-151586 A | 8/2012 |
|---|---|---|
| JP | 2015-009971 A | 1/2015 |

(Continued)

*Primary Examiner* — Patrick H Mackey
(74) *Attorney, Agent, or Firm* — Sughrue Mion, PLLC

(57) ABSTRACT

An image processing device includes: a fold unit that folds a first adjustment sheet including an adjustment pattern, over the adjustment pattern based on a predetermined reference fold position; an image reader that reads an image of the adjustment pattern with the first adjustment sheet folded by the fold unit unfolded; a position identifying unit that, based on a fold line in the image of the adjustment pattern read by the image reader, identifies a position of the fold line; and a position adjusting unit that adjusts a fold position of the fold unit based on a difference between the position of the fold line identified by the position identifying unit and the reference fold position. The image reader includes a scanner that scans the first adjustment sheet relatively in a direction along fold of the first adjustment sheet, and reads the image of the adjustment pattern.

20 Claims, 19 Drawing Sheets

(51) Int. Cl.
    *G03G 15/00* (2006.01)
    *B65H 45/30* (2006.01)
    *B65H 45/18* (2006.01)
    *B65H 43/00* (2006.01)
    *B31F 1/00* (2006.01)

(52) U.S. Cl.
    CPC .............. *B65H 45/18* (2013.01); *B65H 45/30* (2013.01); *G03G 15/0849* (2013.01); *G03G 15/5062* (2013.01); *G03G 15/6582* (2013.01); *H04N 1/00045* (2013.01); *H04N 1/0066* (2013.01); *B65H 2301/17* (2013.01); *B65H 2511/20* (2013.01); *B65H 2511/413* (2013.01); *G03G 2215/00877* (2013.01)

(58) Field of Classification Search
    CPC ........... G03G 15/6582; G03G 15/0849; G03G 15/2064; B31F 1/0022; H04N 1/0045; H04N 1/00702; H04N 1/00718; H04N 1/00761; H04N 1/0066; H04N 1/00639; B41J 13/02; B42C 3/00
    See application file for complete search history.

(56) References Cited

U.S. PATENT DOCUMENTS

| | | | | |
|---|---|---|---|---|
| 8,159,721 B2* | 4/2012 | Lee | ...................... | G06K 9/3283 358/3.26 |
| 8,411,312 B2* | 4/2013 | Kanzawa | ................... | B41J 3/44 358/1.12 |
| 8,570,595 B2* | 10/2013 | Nagakoshi | ........... | H04N 1/0044 358/1.12 |
| 9,641,705 B2* | 5/2017 | Noguchi | ............. | H04N 1/00336 |
| 9,779,337 B2* | 10/2017 | Kuto | ................... | G06K 15/1828 |
| 10,348,920 B2* | 7/2019 | Tanigawa | ............. | H04N 1/0066 |
| 10,350,931 B2* | 7/2019 | Tanigawa | ........... | H04N 1/00761 |
| 10,536,598 B2* | 1/2020 | Tanigawa | ............. | H04N 1/6097 |
| 10,542,163 B2* | 1/2020 | Tanigawa | ............. | G03G 15/607 |
| 2008/0170262 A1* | 7/2008 | Takahashi | .......... | G03G 15/6538 358/1.15 |
| 2010/0195157 A1* | 8/2010 | Sasahara | ............. | G03G 15/655 358/1.18 |
| 2013/0045851 A1* | 2/2013 | Hori | ................... | G03G 15/5095 493/405 |
| 2015/0110527 A1* | 4/2015 | Matsuzaki | ......... | G03G 15/2014 399/297 |
| 2015/0239704 A1* | 8/2015 | Ooba | ................. | G03G 15/6582 493/405 |
| 2015/0306894 A1* | 10/2015 | Wertheimer | ........... | A63H 33/38 281/38 |
| 2019/0075206 A1* | 3/2019 | Tanigawa | ............. | H04N 1/0066 |

FOREIGN PATENT DOCUMENTS

| | | |
|---|---|---|
| JP | 2016-158113 A | 9/2016 |
| JP | 2017-061385 A | 3/2017 |

\* cited by examiner

FIG. 6A

SELECTION OF ADJUSTMENT ITEM
   PLEASE SELECT ADJUSTMENT ITEM.

ALIGNMENT ADJUSTMENT

TRANSFER VOLTAGE ADJUSTMENT

FINISHER ADJUSTMENT

FIG. 6B

FOLD POSITION ADJUSTMENT (SELECTION OF
FOLD PATTERN OR SELECTION OF CREASE)
   PLEASE SELECT FOLD PATTERN
   TO BE ADJUSTED.
   WHEN CREASE IS TO BE ADJUSTED,
   PLEASE SELECT "CREASE".

HALF FOLD          CREASE

INNER TRIPLE FOLD

Z FOLD
   :

FIG. 6C

POSITION ADJUSTMENT (SELECTION OF PAPER)

PLEASE SELECT PAPER TO BE ADJUSTED.

TRAY 1: PLAIN PAPER

TRAY 2: HEAVY PAPER

TRAY 3: COATED PAPER          START TO GENERATE
                                 ADJUSTMENT SHEET
   TRAY 4: THIN PAPER
   :

| | CHARACTERISTICS |
|---|---|
| LANDSCAPE PLACEMENT | EFFECT OF SPECULAR REFLECTION LIGHT IS HIGH |
| PORTRAIT PLACEMENT | EFFECT OF SPECULAR REFLECTION LIGHT IS LOW |

FIG. 14

| | CHARACTERISTICS OF ADJUSTMENT SHEET | STATE OF ADJUSTMENT SHEET WHEN PLACED ON PLATEN | PLACEMENT OF ADJUSTMENT SHEET ON PLATEN |
|---|---|---|---|
| FOLDED ADJUSTMENT SHEET | TONER IS SEPARATED ON FOLD LINE | AMOUNT OF FLOAT OF FOLD LINE IS LARGE | PORTRAIT PLACEMENT (SCANNING IN DIRECTION ALONG FOLD LINE) |
| ADJUSTMENT SHEET HAVING CREASE FORMED | TONER IS NOT SEPARATED ON CREASE | AMOUNT OF FLOAT OF CREASE IS SMALL | LANDSCAPE PLACEMENT (SCANNING IN DIRECTION CROSSING DIRECTION ALONG CREASE) |

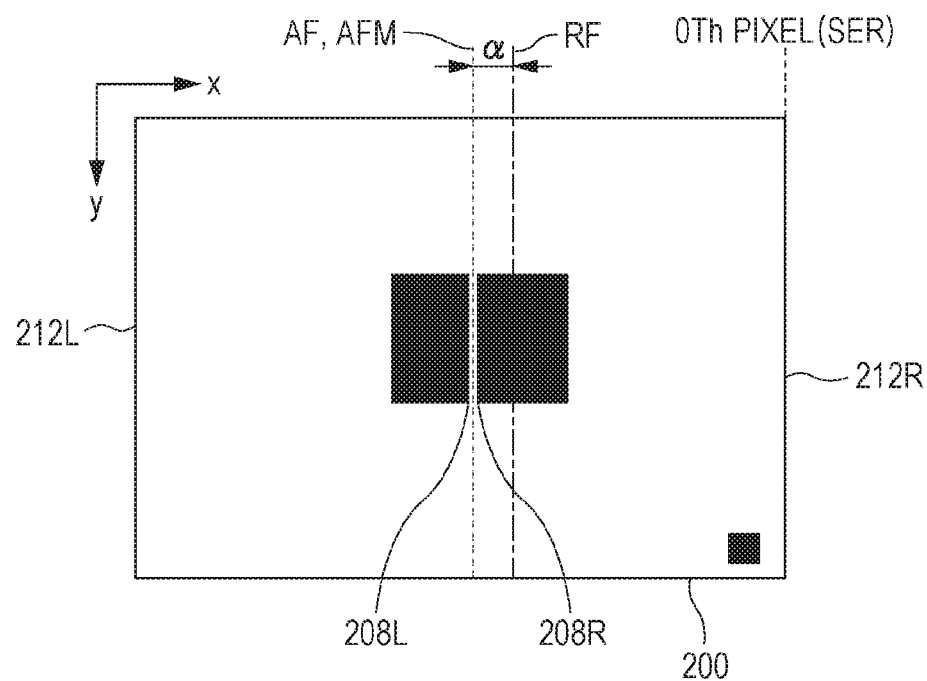

IMAGE PROCESSING DEVICE WITH A FOLD UNIT FOR FOLDING A POSITION ADJUSTMENT SHEET AND METHOD THEREFOR

CROSS-REFERENCE TO RELATED APPLICATIONS

This application is based on and claims priority under 35 USC 119 from Japanese Patent Application No. 2017-171112 filed on Sep. 6, 2017.

BACKGROUND

Technical Field

The present invention relates to an image processing device and a method.

SUMMARY

According to an aspect of the invention, there is provided an image processing device including: a fold unit that folds a first adjustment sheet, in which an adjustment pattern is formed, over the adjustment pattern based on a predetermined reference fold position; an image reader that reads an image of the adjustment pattern of the first adjustment sheet with the first adjustment sheet folded by the fold unit unfolded; a position identifying unit that, based on a fold line which appears in the image of the adjustment pattern read by the image reader, identifies a position of the fold line; and a position adjusting unit that adjusts a fold position of the fold unit based on a difference between the position of the fold line identified by the position identifying unit and the reference fold position. The image reader includes a scanner that scans the first adjustment sheet relatively in a direction along fold of the first adjustment sheet, and reads the image of the adjustment pattern.

BRIEF DESCRIPTION OF THE DRAWINGS

Exemplary embodiment of the present invention will be described in detail based on the following figures, wherein:

FIGS. 6A to 6C are diagrams illustrating an example of a setting screen for the fold position adjustment processing and the crease position adjustment processing;

FIG. 14 is a table illustrating characteristics of folded paper and paper in which a crease is formed, a state of the adjustment sheet when placed on the platen glass, and a placement manner of the adjustment sheet on the platen glass;

FIGS. 16A and 16B illustrate an example of a pattern used for pattern matching when the position of a fold line is identified;

FIG. 17 is an explanatory diagram for the difference between the position of a fold line and a reference fold position;

DETAILED DESCRIPTION

Hereinafter, an exemplary embodiment of the invention will be described with reference to the drawings.

<Device Configuration>

Figure 1:
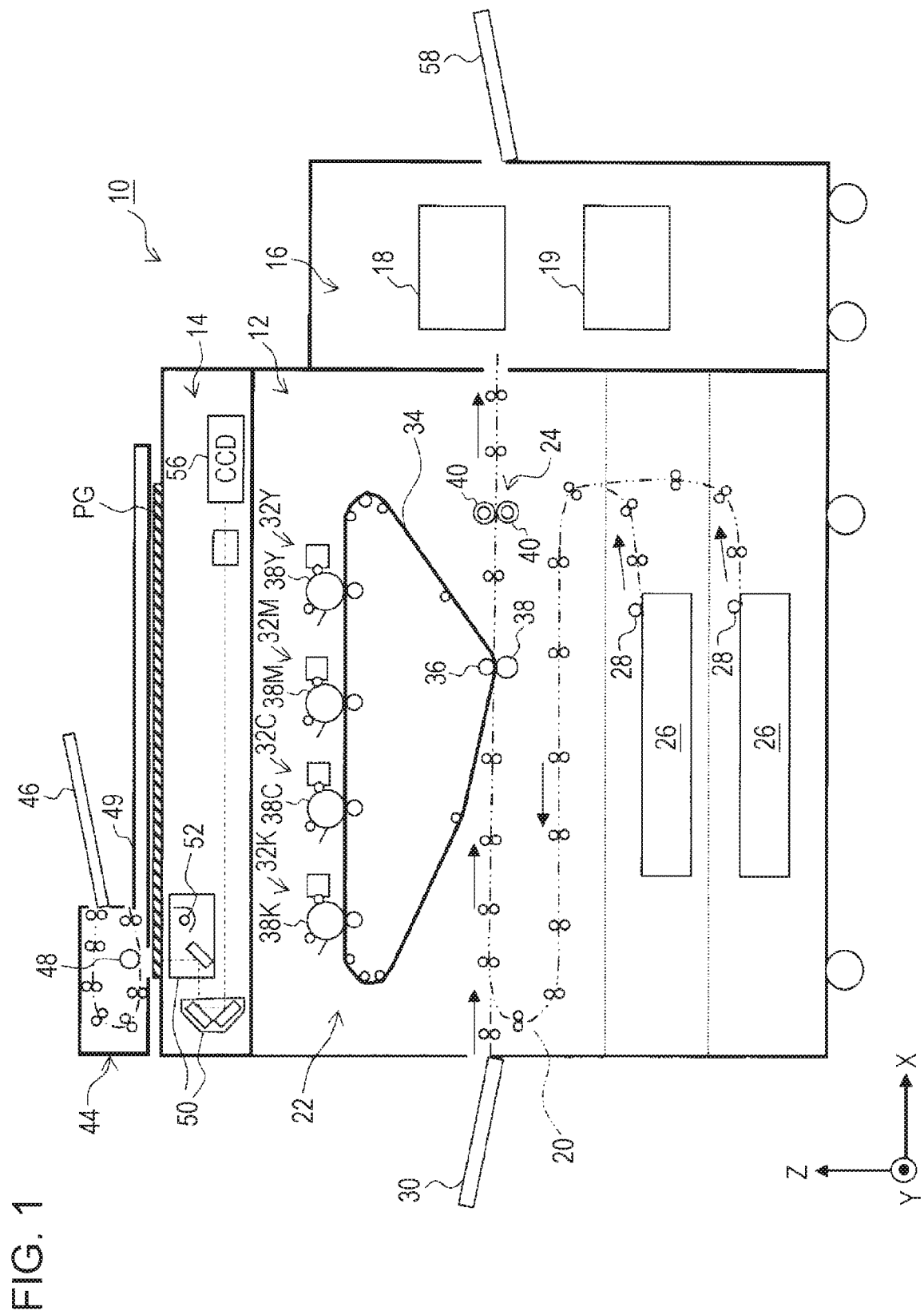
FIG. 1 is a schematic configuration diagram of an image processing device.

FIG. 1 is a schematic configuration diagram of an image processing device in this exemplary embodiment. The image processing device 10 in this exemplary embodiment is, for instance, a copy machine that has a copy function of forming an image of a document on the recording paper by the image former 12, the document being read by the image reader 14.

The image processing device 10 in this exemplary embodiment is, for instance, a copy machine that has a copy function of forming an image of a document on the recording paper by the image former 12, the document being read by the image reader 14. Also, the image processing device 10 in this exemplary embodiment is connected to, for instance, a personal computer (hereinafter referred to as a PC) via a network, and performs printing by the image former 12 based on image data inputted as a print job from a PC.

The image processing device 10 receives an instruction for fold processing to be performed on the recording paper from a user interface (hereinafter referred to as a UI) provided in the device body or a PC, and a fold unit 18 of the post processor 16 performs fold processing on the recording paper. The image processing device 10 receives an instruction for crease formation processing to be performed on the recording paper from a UI or a PC provided in the device body, and a crease former 19 of the post processor 16 performs the crease formation processing on the recording paper. As described below, the image processing device 10 adjusts the position of a fold line of the recording paper by the fold unit 18, and adjusts the position of crease of the recording paper formed by the crease former 19. It is to be noted that in the present description, the "recording paper" is not limited to a sheet (medium) on which an image is formed, and includes a sheet on which an image is not formed.

The image former 12 includes a transport path 20 for transporting the recording paper, a toner image former 22 that forms a toner image on the recording paper, and a fixing unit 24 that fixes a toner image on the recording paper. Also, the image processing device 10 includes multiple sheet trays 26 in which sheets of recording paper are to be stored. Although FIG. 1 illustrates two sheet trays 26, actually more than two sheet trays 26 are provided. In each of the sheet trays 26, sheets of recording paper are stored according to a type (kind) of the recording paper, for instance.

The uppermost sheet of recording paper among multiple sheets of recording paper stored in the sheet trays 26 is to be delivered to the transport path 20 by a delivery roller 28. The transport path 20 has one end connected to each sheet tray 26 and the other end connected to a transport path (not illustrated) of the post processor 16 through the toner image former 22. Thus, the recording paper delivered from the sheet trays 26 to the transport path 20 is transported to the toner image former 22, and subsequently, is transported to the post processor 16 through the fixing unit 24.

As illustrated in FIG. 1, the image processing device 10 includes a bypass tray 30. The recording paper placed on the bypass tray 30 is also delivered to the transport path 20, and is transported to the toner image former 22, and subsequently, is transported to the post processor 16 through the fixing unit 24.

The toner image former 22 includes developing units 32Y, 32M, 32C, and 32K having respective colors of yellow (Y), magenta (M), cyan (C), and black (K), and an endless transfer belt 34 as an intermediate retention body. The transfer belt 34 is wound around multiple rollers including the transfer roller 36 near the transport path, and is rotationally driven. Also, the transfer belt 34 is in contact with photoconductor drums 38Y, 38M, 38C, and 38K which are provided in the developing units 32Y, 32M, 32C, and 32K.

The toner image former 22 is to receive input of image signals (raster data) having respective colors of Y, M, C, and K generated based on image data. The toner image former 22 forms toner images in colors of Y, M, C, and K in the respective photoconductor drums 38Y, 38M, 38C, and 38K of the developing units 32Y, 32M, 32C, and 32K based on the image signals, and the toner images are superimposed on the transfer belt 34 and transferred.

In the transfer roller 36, a roller 38 (bias transfer roller) is provided to be opposed to the transfer roller 36, and the recording paper is delivered between the transfer roller 36 and the roller 38, and is sandwiched between the transfer roller 36 and the roller 38 along with the transfer belt 34. Consequently, the recording paper is delivered while toner images of the transfer belt 34 are being transferred to the recording paper.

The fixing unit 24 includes a pair of fixing rollers 40, and the recording paper on which toner images have been transferred is delivered between the fixing rollers 40. The fixing unit 24 sandwiches the recording paper, which is delivered between the fixing rollers 40, between the fixing rollers 40, heats the recording paper while pressurizing the recording paper, and delivers the recording paper on which toner images are fixed. Consequently, an image according to the image data is formed on the recording paper.

A general configuration using an electrophotographic system may be applied to the image former 12 described above, and a detailed description is omitted.

The image processing device 10 includes an automatic document transporter 44. The automatic document transporter 44 is supported on a platen glass PG which is a document base on the upper surface of the image reader 14 (image scanner). The automatic document transporter 44 has a document sheet supply tray 46 in which multiple documents having an image to be read are placed in the stack. Each of multiple documents placed in the document paper supply tray 46 is sequentially passed through a copy position on the platen glass PG, in other words, a pressure-contact position of a platen roller 48 of the document transporter 44, and is discharged to a document paper output tray 49. The automatic document transporter 44 is rotatable with respect to the platen glass PG upper surface around a rotation shaft (not illustrated) provided at the rear end, which extends in a crosswise direction (the X-axis direction of FIG. 1). When a user or the like places a document on the platen glass PG by a hand, the automatic document transporter 44 is rotated upward.

The image reader 14 is disposed below the platen glass PG, and includes an exposure optical system 50 that reads a document image. The exposure optical system 50 includes a light source 52 and multiple mirrors. A document transported to the platen glass PG upper surface and passed through a copy position by the automatic document transporter 44 or a document manually placed on the platen glass PG is irradiated with light from the light source 52, and a reflection light from the document is passed through the exposure optical system 50 and converted to an electrical signal by a solid-state imaging charge coupled device (CCD) 56. It is to be noted that when an image of a manually placed document on the platen glass PG is read, the exposure optical system 50 moves in the X-axis direction of FIG. 1, and scans the document. Hereinafter, the exposure optical system 50 is also referred to as a scanner.

A general configuration of, for instance, a CCD image scanner may be applied to the image reader 14 described above, and a detailed description is omitted.

The finisher in the post processor 16 includes the fold unit 18 that performs fold processing on the recording paper transported from the image former 12, a crease former 19 that performs crease formation processing on the recording paper, and a discharge tray 58. The fold unit 18 folds the recording paper by a set folding method such as half fold, inner triple fold, Z fold, and discharges the folded recording paper to the discharge tray 58. The crease former 19 forms (provides) a crease in recording paper, and discharges the recording paper to the discharge tray 58. The discharged recording paper is to be folded along the crease by a user or the like. It is to be noted that the post processor 16 may include a booklet creator (not illustrated) that creates a booklet by stacking multiple sheets of recording paper, saddle stitching the stacked sheets of recording paper, and half-folding the sheets of recording paper, and a stapler (not illustrated) that stacks multiple sheets of recording paper, and staples the stacked sheets of recording paper at a predetermined position of the peripheral edge. A publicly known configuration in related art may be applied to the fold unit 18, the crease former 19, the booklet creator, and the stapler.

Figure 2A:
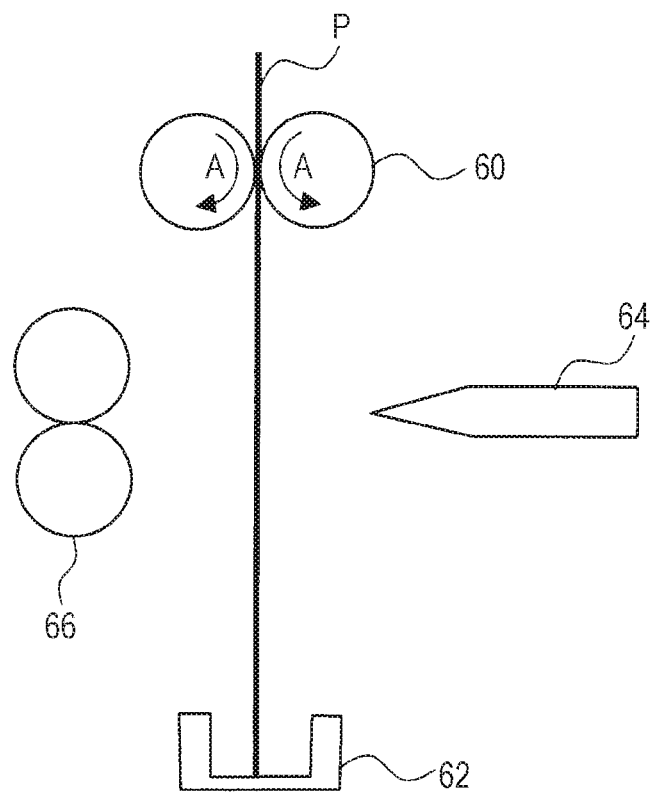
FIGS. 2A and 2B are schematic diagrams of an example of the mechanism of a fold unit.
Figure 2B:
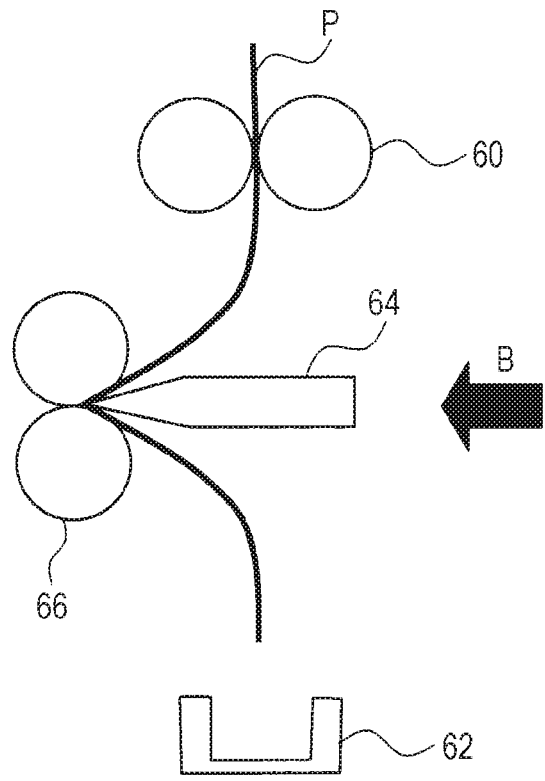

FIGS. 2A and 2B are schematic diagrams of an example of a mechanism of the fold unit 18.

As illustrated in FIG. 2A, recording paper P is transported by a pair of transport rollers 60 which are rotated in the direction of an arrow A, and is bumped against a gate 62. When the recording paper P is bumped against the gate 62, transportation is stopped. When the transportation is stopped, as illustrated in FIG. 2B, a knife-shaped folding member 64 moves to a pair of folding rollers 66 in the direction of an arrow B, and pushes the recording paper P into the pair of folding rollers 66. Consequently, the recording paper P is folded by the pair of folding rollers 66.

The fold position of the recording paper P depends on, for instance, the amount of deflection of the recording paper P pushed out from the pair of transport rollers 60. The recording paper P may be deflected depending on paper characteristics (such as the thickness, and the degree of elasticity of recording paper P), and the amount of deflection may vary. Thus, the fold position has to be adjusted according to the paper characteristics of the recording paper P. It is to be noted that the fold position of the recording paper P may vary due to a factor other than the "amount of deflection" mentioned above.

Figure 3A:
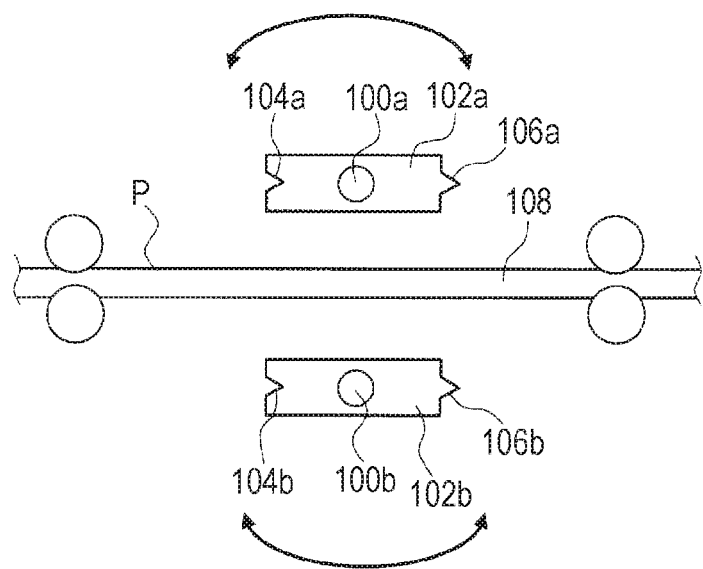
FIGS. 3A to 3C are schematic diagrams of an example of the mechanism of a crease former.
Figure 3B:
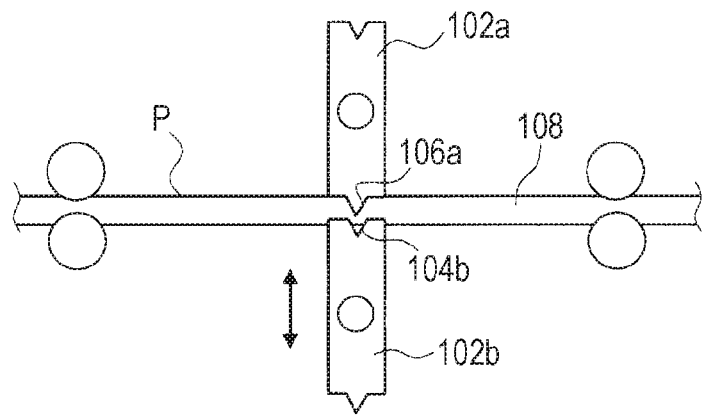
Figure 3C:
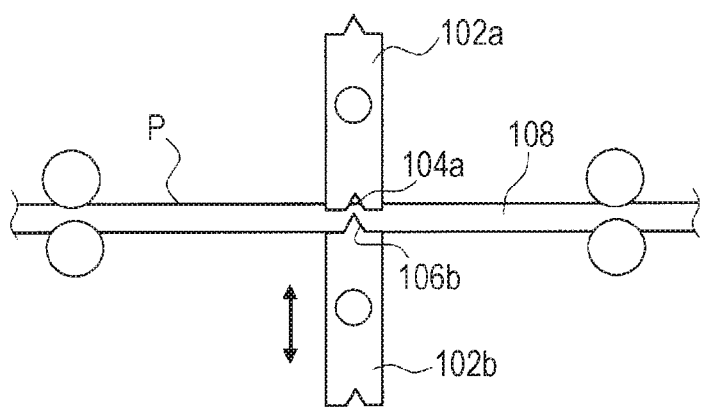

FIGS. 3A to 3C are schematic diagrams of an example of the mechanism of the crease former 19. In FIGS. 3A to 3C, the recording paper P is illustrated with an exaggerated thickness.

As illustrated in FIG. 3A, the crease former 19 includes an upper block 102a rotatably supported by a shaft 100a, and a lower block 102b rotatably supported by a shaft 100b. A triangular groove 104a is formed on a face of the upper block 102a, and a triangular projection 106a is formed on the face opposite to the triangular groove 104a. Also, a triangular groove 104b is formed on a face of the lower block 102b, and a triangular projection 106b is formed on the face opposite to the triangular groove 104b.

When a crease is formed in the recording paper P transported, as illustrated in FIG. 3B, the triangular projection 106a of the upper block 102a and the triangular groove 104b of the lower block 102b are rotated and fixed (first fixed position) to positions opposed to each other across a transport path 108, the lower block 102b is moved to the upper block 102a, the triangular projection 106a and the triangular groove 104b are fitted to each other, the lower block 102b is brought into pressure contact with the upper block 102a, and a crease is formed in the transported recording paper P.

Also, as illustrated in FIG. 3C, the triangular groove 104a of the upper block 102a and the triangular projection 106b of the lower block 102b are rotated and fixed (second fixed position) to positions opposed to each other across a transport path 108, the lower block 102b is moved to the upper block 102a, the triangular groove 104a and the triangular projection 106b are fitted to each other, the lower block 102b is brought into pressure contact with the upper block 102a, and a crease is formed in the transported recording paper P. Thus, a crease in an inverted orientation of the above-mentioned crease is formed in the recording paper P.

The crease position of the recording paper P may be displaced from a position specified by a user, and the crease position has to be adjusted.

<Control Configuration>

Figure 4:
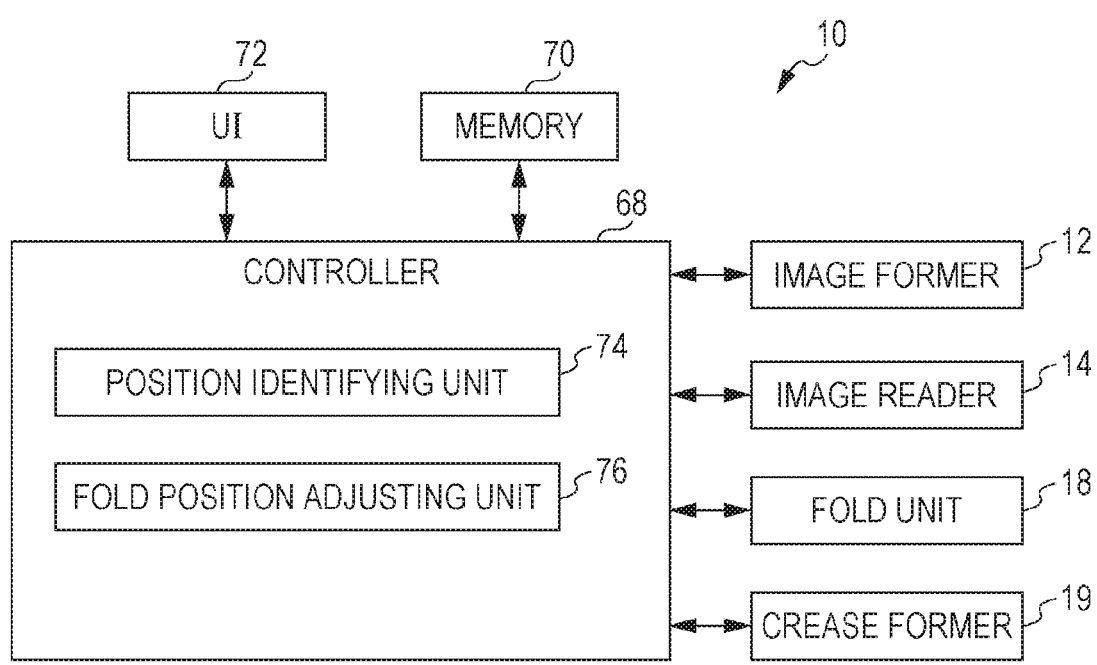
FIG. 4 is a diagram illustrating a control configuration of fold position adjustment processing and crease position adjustment processing of the image processing device.

FIG. 4 is a block diagram illustrating the control configuration of fold position adjustment processing and crease position adjustment processing of the image processing device 10 in this exemplary embodiment. The image processing device 10 includes a controller 68, a memory 70, and a user interface (UI) 72. The controller 68 includes a processor such as a CPU, and executes processing in accordance with a program stored in the memory 70. Thus, the controller 68 functions as the later-described position identifying unit 74, and position adjusting unit 76. The memory 70 is a ROM, a RAM, or a flash memory or the like, and stores a program executed by the controller 68, an adjustment value determined by the fold position adjustment processing, an adjustment value determined by the crease position adjustment processing, and temporary data. The UI 72 displays a setting screen in the fold position adjustment processing and the crease position adjustment processing, and receives an operation from a user or a serviceman or the like (hereinafter referred to as a user). The controller 68 is connected to the image former 12, the image reader 14, the fold unit 18, and the crease former 19, and can control each of these components.

<Fold Position Adjustment Processing>

Figure 5:
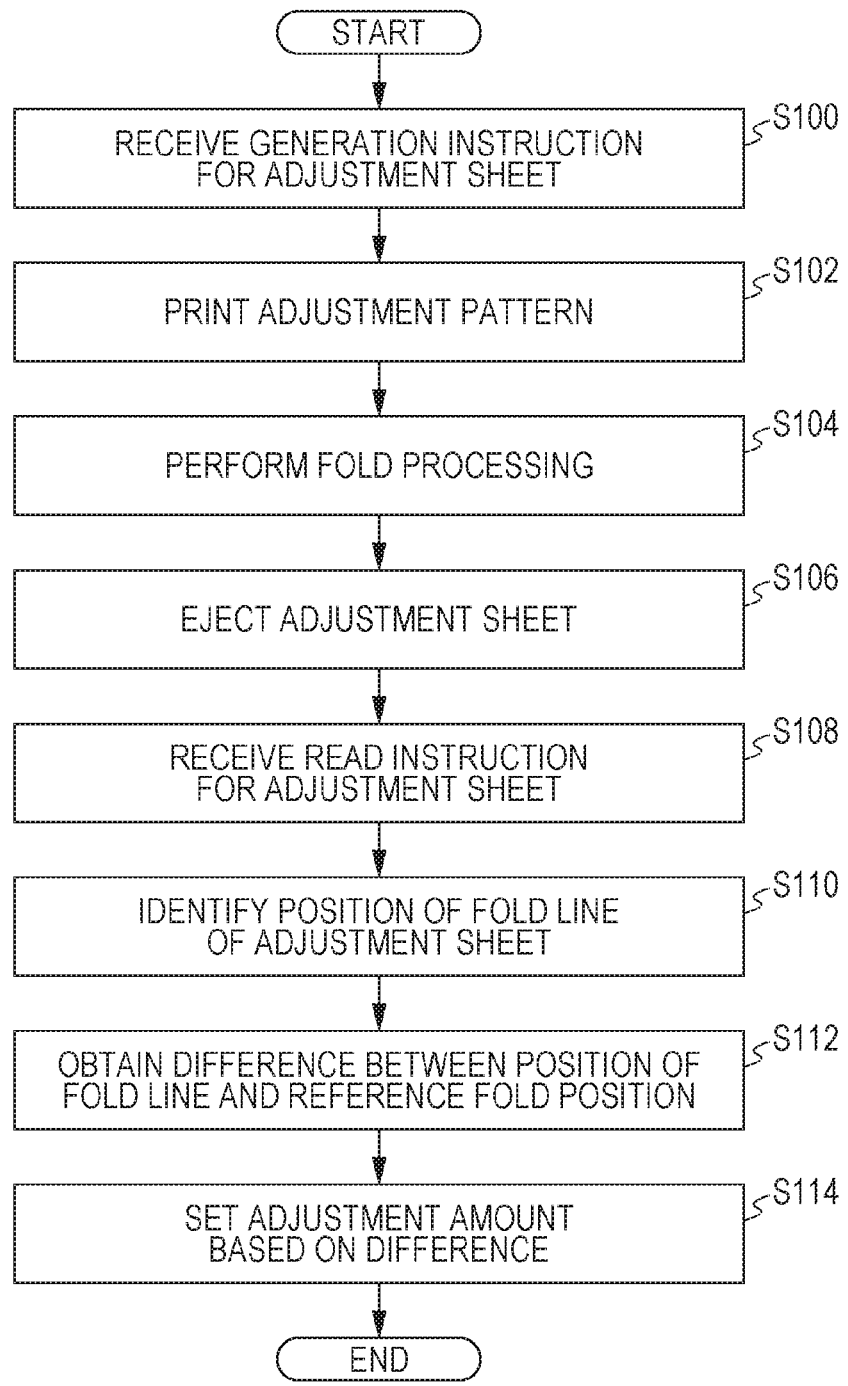
FIG. 5 is a flowchart illustrating the flow of the fold position adjustment processing of the image processing device.

Next, the fold position adjustment processing will be described. FIG. 5 is a flowchart illustrating the flow of the fold position adjustment processing of the image processing device 10. In this exemplary embodiment, the fold position adjustment processing is performed by executing the flow of FIG. 5 for each of the types of recording paper and for each of the fold patterns of recording paper.

First, in S100, the controller 68 receives a generation instruction for an adjustment sheet (first adjustment sheet) via the UI 72. FIGS. 6A to 6C are each an example of a setting screen of the fold position adjustment processing and an adjustment sheet generation instruction receiving screen displayed on the UI 72. First, a selection screen for adjustment item illustrated in FIG. 6A is displayed, and "finisher adjustment" is selected by a user, for instance. Next, a selection screen for fold pattern illustrated in FIG. 6B is displayed, and a fold pattern to be adjusted is selected by a user. Next, a selection screen for recording paper (paper) illustrated in FIG. 6C is displayed, and recording paper to be adjusted is selected by a user. When the "start to generate adjustment sheet" button illustrated in FIG. 6C is touched, a generation instruction for an adjustment sheet is received. When a generation instruction for an adjustment sheet is received, the controller 68 controls the image former 12, supplies the recording paper from the paper tray 26 which stores the recording paper (paper) selected in FIG. 6C, and delivers the recording paper to the transport path 20. It is also possible for a user to place the recording paper selected in FIG. 6C in the bypass tray 30, and to supply the recording paper from the bypass tray 30 by touching the "start to generate adjustment sheet" button, and to deliver the recording paper to the transport path 20. The supplied recording paper serves as an adjustment sheet (first adjustment sheet). The adjustment sheet may also be simply referred to as the "sheet".

Figure 7A:
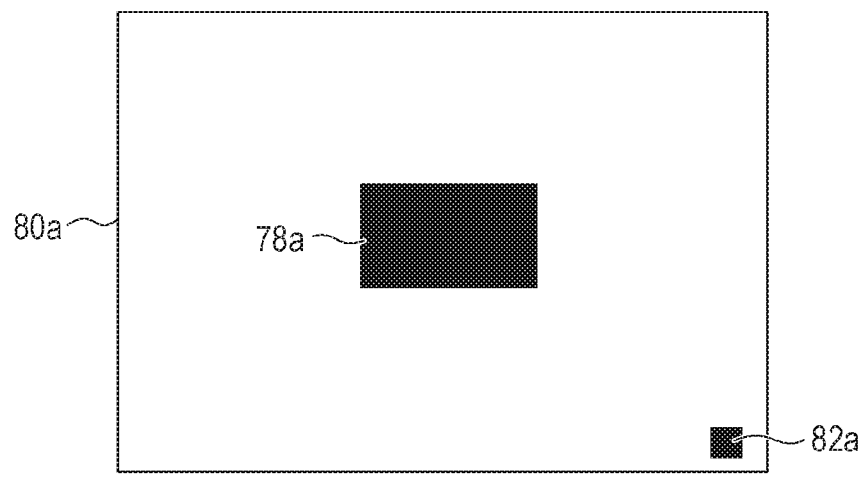
FIG. 7A is an example of an adjustment sheet on which an adjustment pattern in the fold position adjustment processing is printed.

Next, in S102 of FIG. 5, the controller 68 controls the image former 12 so that a predetermined adjustment pattern is printed on the recording paper (adjustment sheet) supplied from the paper tray 26 or the bypass tray 30. FIG. 7A is a diagram illustrating an example of an adjustment sheet 80a (first adjustment sheet) on which an adjustment pattern 78a is printed. The adjustment pattern 78a in this exemplary embodiment is a pattern (patch) that is filled with color at a fixed density, and is printed (formed) in at least part of the area in which the adjustment sheet 80a is folded by the fold unit 18 of the post processor 16. It is to be noted that the mark printed in a corner area of the adjustment sheet 80a of FIG. 7A indicates an edge (reference edge mark 82a) as a reference in the crosswise direction of FIG. 7A.

Although the adjustment pattern 78a is printed near the center of the adjustment sheet 80a in FIG. 7A, the adjustment pattern 78a may be printed near the upper side, the lower side, or from the upper side to the lower side. Also, the width (the width in the crosswise direction in FIG. 7A) of the adjustment pattern 78a is not limited to the what is illustrated in FIG. 7A, and may be narrower or wider than the what is illustrated in FIG. 7A (for instance, the width of the adjustment pattern 78a which is printed over the entire length in the crosswise direction of the adjustment sheet 80).

The adjustment pattern 78a is printed with toner of K color only, for instance. Alternatively, the adjustment pattern 78a is printed in black using toner obtained by mixing, for instance, C color, M color, and Y color toners. Alternatively, the adjustment pattern 78a may be gray color at a predetermined density, or a color other than black, at a predetermined density. The color of the adjustment pattern 78a, and the position of the adjustment pattern 78a on the adjustment sheet 80a are pre-stored in the memory 70, for instance. It is to be noted that "fixed density" in "an adjustment pattern filled with color at a fixed density" does not necessarily mean that the density is fixed in a strict sense, and includes, for instance, a varied density which may occur due to a design or an operation.

Figure 7B:
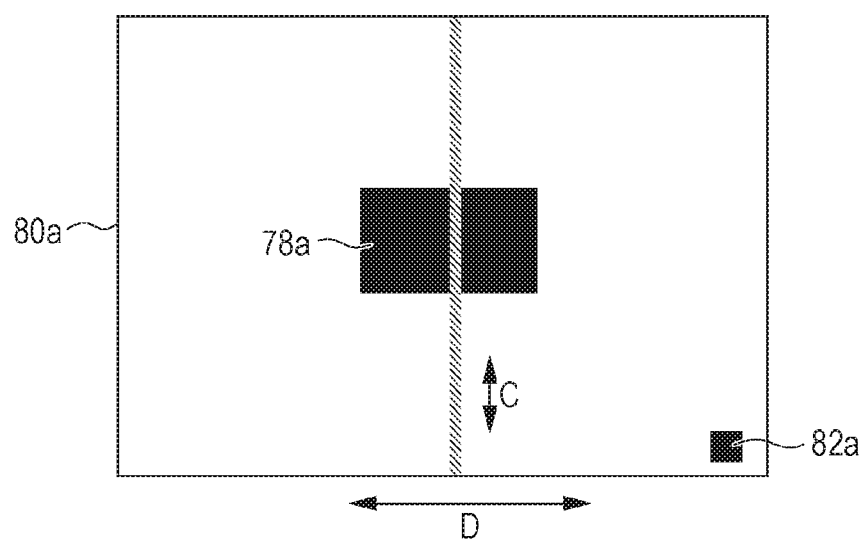
FIG. 7B is an example of a state of the adjustment sheet on which fold processing is performed.

In S102 of FIG. 5, after an adjustment pattern is printed on the adjustment sheet, the adjustment sheet is delivered to the post processor 16. In S104, the controller 68 controls the fold unit 18 so that fold processing is performed on the adjustment sheet. The fold processing is performed using a fold pattern selected in FIG. 6B. FIG. 7B illustrates an example of the adjustment sheet 80a on which the half fold processing is performed after "half fold" is selected in FIG. 6B. The fold position is illustrated by an oblique line in FIG. 7B. The fold position of the adjustment sheet 80a is pre-stored as a reference fold position in the memory 70, for instance. In other words, the reference fold position is a predetermined fold position. Although the fold unit 18 performs fold processing on the adjustment sheet 80a in accordance with a reference fold position, an actual fold position may deviate from the reference fold position. Here, the fold unit 18 performs fold processing across the adjustment pattern 78a. It is to be noted that as illustrated in FIG. 7B, a reference edge mark 82a indicates an edge as a reference in a direction (crossing direction) D crossing a direction C along the fold of the adjustment sheet 80a.

Figure 8:
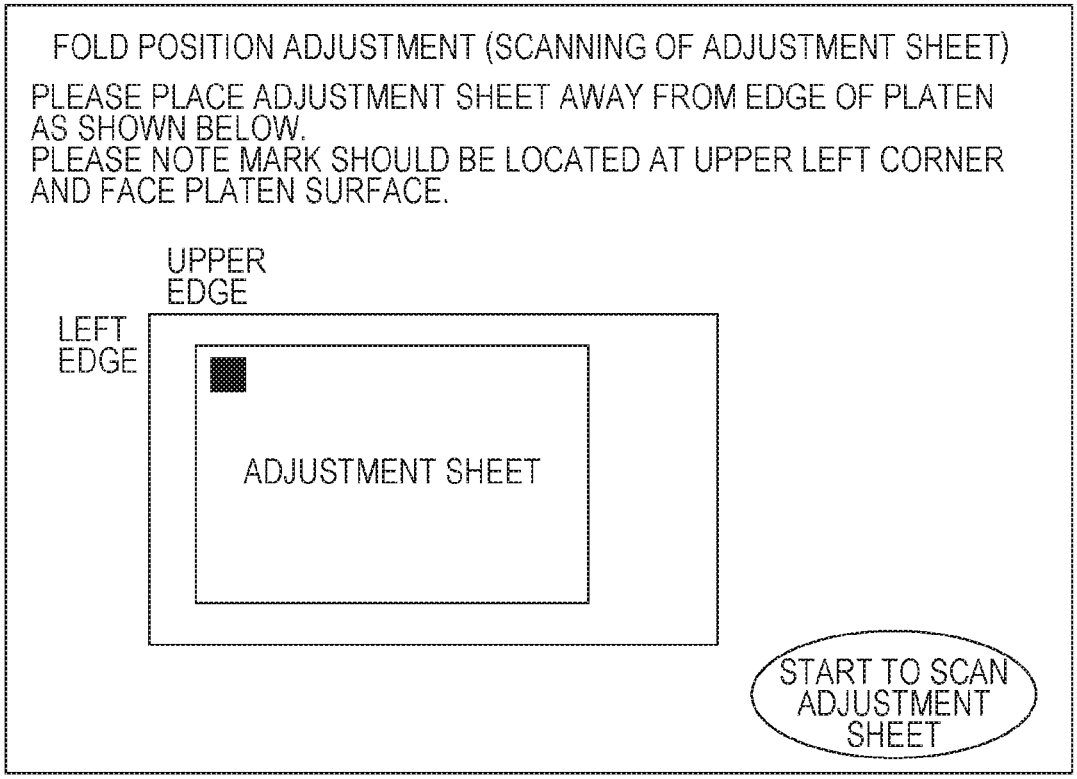
FIG. 8 illustrates an example of a guide screen when an adjustment sheet in the fold position adjustment processing is placed on a platen glass.

Next, in S106 of FIG. 5, the controller 68 discharges the adjustment sheet folded by the fold unit 18 to the discharge tray 58. A user then unfolds the adjustment sheet (folded adjustment sheet) discharged from the discharge tray 58, and places the unfolded adjustment sheet on the platen glass PG (also simply referred to as the platen PG) at an upper portion of the image reader 14. FIG. 8 is an example of a guide screen for placing an adjustment sheet displayed on the UI 72 on the platen glass PG. As illustrated in FIG. 8, the UI 72 displays guidance indicating that an adjustment sheet should be placed away from the edge of the platen glass PG (platen PG). Also, guidance is displayed, which indicates that the reference edge mark (■ mark) printed in a corner area of the adjustment sheet should be located at an upper left corner, and the side of the adjustment sheet, on which the reference edge mark (and the adjustment pattern) are printed, should face the platen glass PG surface. A user unfolds and places the adjustment sheet on the platen glass PG in accordance with the guidance.

Figure 9:
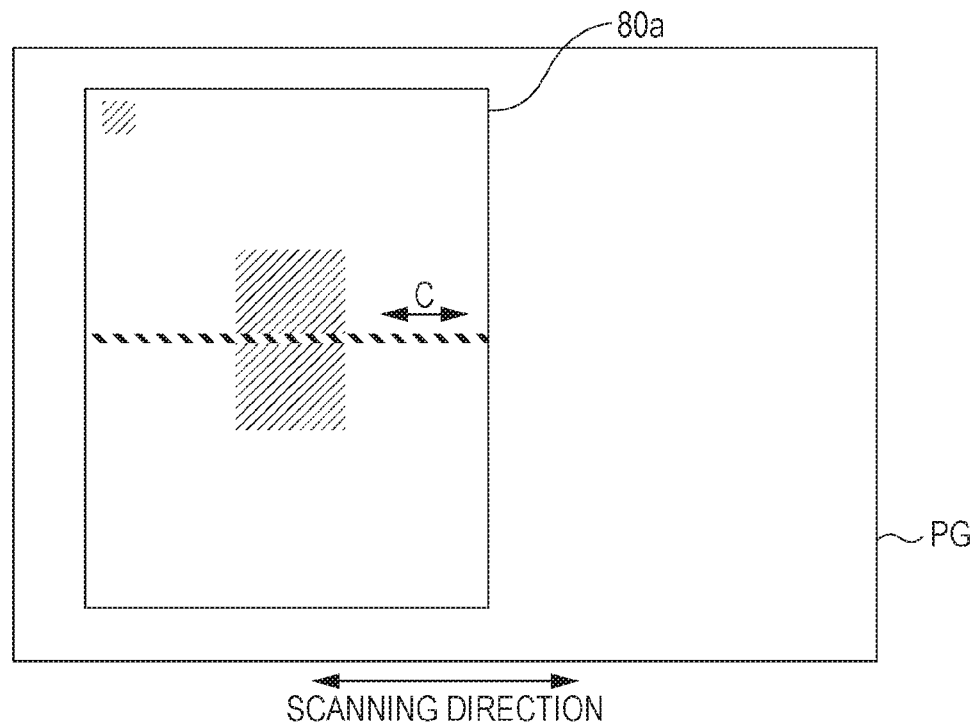
FIG. 9 illustrates a state where an adjustment sheet is placed on the platen glass in the fold position adjustment processing.

FIG. 9 is a top view of the adjustment sheet 80a (the first adjustment sheet) which is placed on the platen PG. Since the adjustment sheet 80a is placed such that the side thereof, on which the reference edge mark and the adjustment pattern are printed, faces the platen PG in FIG. 9, the reference edge mark and the adjustment pattern are not seen. However, in order to clarify those positions, the positions are illustrated by thin lines. In FIG. 9, the scanning direction of the exposure optical system 50 (scanner) of the image reader 14 is also illustrated. As illustrated in FIG. 9, the adjustment sheet 80a (the first adjustment sheet) is placed on the platen PG so that the image of the adjustment pattern of the adjustment sheet is read by scanning the adjustment sheet with the scanner of the image reader 14 in direction C along the fold line (thick oblique lines of FIG. 9). Hereinafter, the above-mentioned placement of the adjustment sheet on the platen PG is also referred to as the "portrait placement".

Next, in S108 of FIG. 5, the controller 68 receives a read instruction for adjustment sheet via the UI 72. Specifically, when the "start to scan adjustment sheet" button illustrated in FIG. 7 is touched, a read instruction for adjustment sheet is received. The controller 68 controls the image reader 14 so that an image on the adjustment sheet is read. Specifically, the exposure optical system 50 of the image reader 14 moves to scan the adjustment sheet, thereby reading an image on the adjustment sheet (an image of the adjustment pattern). In this manner, the image reader 14 reads the image of an adjustment pattern of the adjustment sheet with the adjustment sheet folded by the fold unit 18 unfolded.

Figure 10:
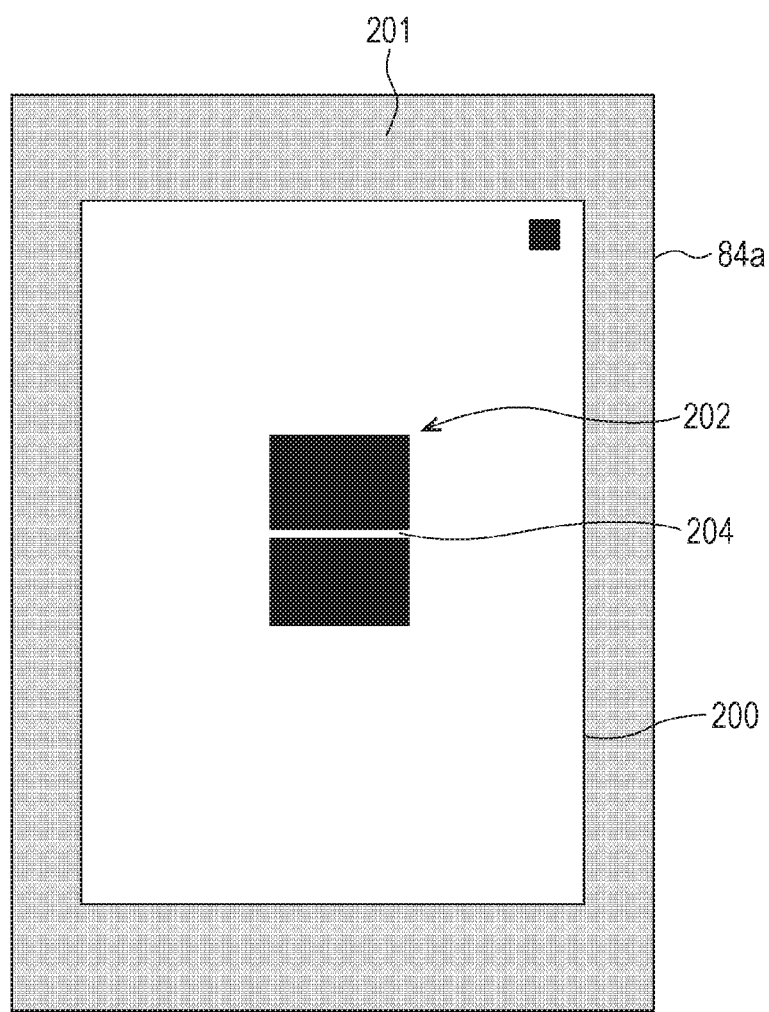
FIG. 10 illustrates an example of an image of an adjustment pattern of an adjustment sheet which is read in the fold position adjustment processing.

FIG. 10 illustrates an example of an image 84a of an adjustment pattern which is read. When the image of the read adjustment pattern is a color image, the adjustment pattern may be converted from a color image into a monochrome image by a publicly known method in related art. FIG. 10 illustrates an image after the conversion. As illustrated in FIG. 10, since the adjustment sheet is placed away from the edge of the platen PG, the image 84a of the adjustment pattern includes an outside area 201 of an adjustment sheet 200. In other words, the outer area (edge portion) of the adjustment sheet appears in the image 84a of the adjustment pattern.

In the image 84a of the adjustment pattern, an area 204 including a fold line appears in white color or a color with a low density in an area 202 of the adjustment pattern. As factors of this phenomenon, for instance, the following two factors may be considered. The first factor is that the toner on the fold line is separated because the adjustment sheet (the first adjustment sheet) is folded. In other words, the toner on a fold line portion of the adjustment pattern filled with color at a fixed density is separated, and thus the fold line appears in the image of the adjustment pattern. The second factor is that when the adjustment sheet is placed on the platen glass PG, a fold line portion is floated from the platen glass PG, and the angle of reflection light changes at the fold line portion. Thus, the image reader 14 receives specular reflection light which is not supposed to be received by the image reader 14. The controller 68 identifies the position of the fold line in the adjustment sheet by identifying the position of white color appearing in the image 84a of the adjustment pattern or a color with a low density.

In this exemplary embodiment, the adjustment sheet has such a feature that when the image of the adjustment pattern is read with the "portrait placement" applied to the adjustment sheet (the first adjustment sheet) on the platen PG, in the image of the adjustment pattern, the area 204 including a fold line in the area 202 of the adjustment pattern appears clearly. Specifically, in FIG. 10, the adjustment sheet has such a feature that in black color (or a color with a high density) of the area 202 of the adjustment pattern, white color (or a color with a low density) of the area 204 including a fold line appears clearly.

Figures 11, 12:
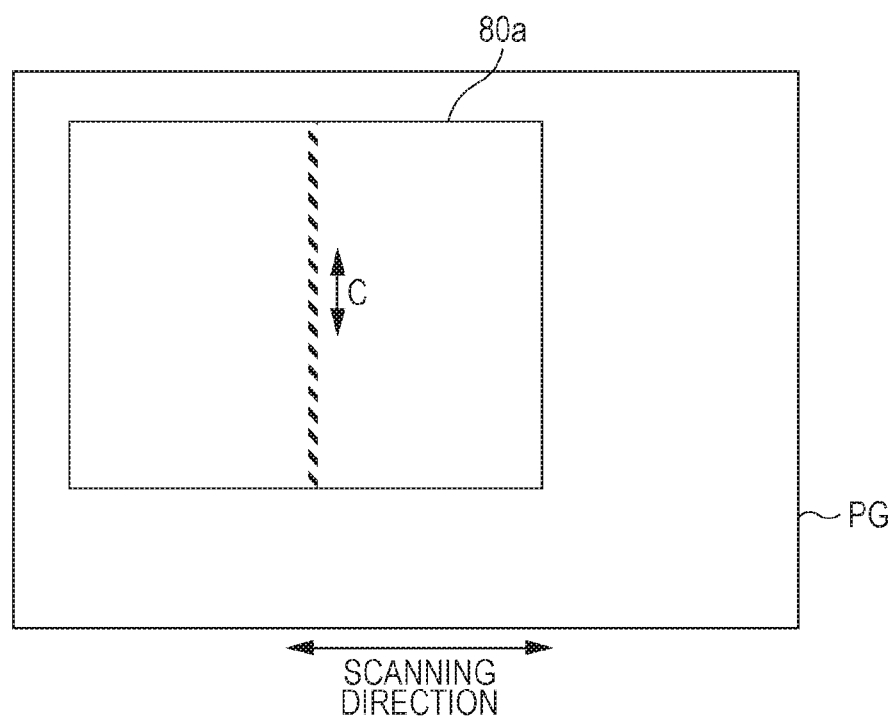
FIG. 11 is a table illustrating the effect of specular reflection light on the image of an adjustment pattern when "landscape placement" or "portrait placement" is applied to the adjustment sheet on the platen glass.
FIG. 12 illustrates a state where "landscape placement" is applied to the adjustment sheet on the platen glass.

The possibility of receiving the above-mentioned specular reflection light which is not supposed to be received by the image reader 14 varies with placement manner of the adjustment sheet on the platen PG. As illustrated in FIG. 11, when "landscape placement" is applied to the adjustment sheet on the platen PG, the possibility of receiving the specular reflection light is higher, as compared with the case where "portrait placement" is applied to the adjustment sheet. Here, the "landscape placement" is the placement after the adjustment sheet 80a with portrait placement illustrated in FIG. 9 is rotated 90 degrees, and indicates the placement illustrated in FIG. 12. In other words, as illustrated in FIG. 12, the "landscape placement" is the placement of the adjustment sheet on the platen PG so that the image of the adjustment pattern of the adjustment sheet is read by scanning the adjustment sheet with the scanner of the image reader 14 in a direction (crossing direction) which crosses the direction C along the fold line (oblique lines of FIG. 12).

Figure 13A:
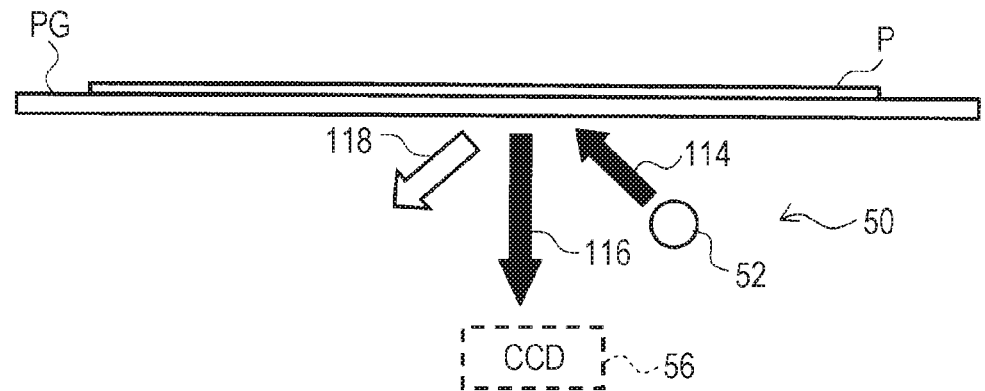
FIGS. 13A and 13B are explanatory diagrams for change in the reflection angle of specular reflection light.
Figure 13B:
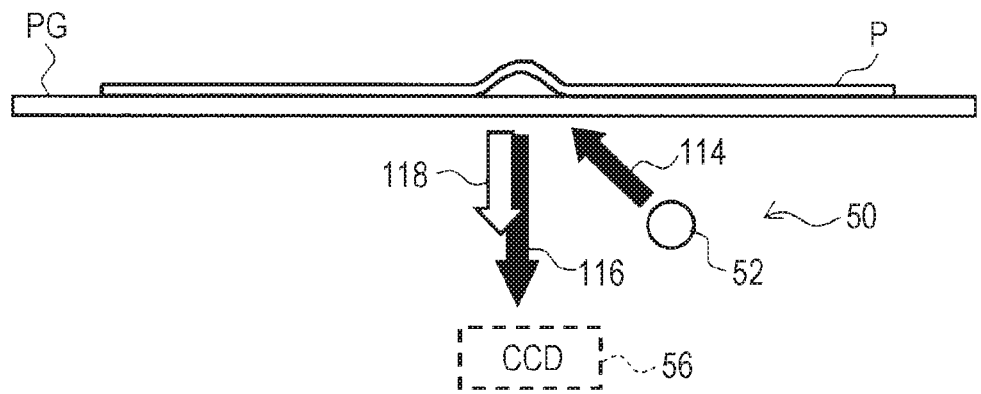

FIGS. 13A and 13B are explanatory diagrams for the effect of specular reflection light when the "landscape placement" is applied to the recording paper P such as the adjustment sheet 80a on the platen PG and an image formed (printed) on the recording paper P is read. FIG. 13A illustrates a state where the image on the recording paper P, which has not been folded, is read, whereas FIG. 13B illustrates a state where the image on the recording paper P, which has been folded, is read. In FIGS. 13A and 13B, the exposure optical system 50 (scanner) scans the recording paper P from the left to the right or from the right to the left, and reads the image on the recording paper P. As illustrated in FIG. 13A, when the image on the non-folded recording paper P is read, illumination light 114 emitted from the light source 52 of the exposure optical system 50 reaches the recording paper P, diffuse reflection light 116 from the recording paper P is inputted into the CCD 56 via multiple mirrors (not illustrated), and specular reflection light 118 is not inputted into the CCD 56. In contrast, when the image on the folded recording paper P is read, as illustrated in FIG. 13B, a fold line portion is floated from the platen PG, and the angle of the specular reflection light 118 changes at the fold line portion. Thus, the specular reflection light 118 is inputted into the CCD 56.

FIGS. 13A and 13B illustrate the case where "landscape placement" is applied to the recording paper P, whereas when "portrait placement" is applied to the recording paper P, even if a fold line portion of the recording paper P is floated from the platen PG, the specular reflection light 118 is not inputted into the CCD 56, or the possibility of input of the specular reflection light 118 into the CCD 56 is low. This is because in the case of "portrait placement", the exposure optical system 50 (scanner) scans the recording paper P in the direction along the fold line (see FIG. 9), and at the fold line floated from the platen PG, the reflection angle of the specular reflection light 118 does not change or hardly changes.

As described above, when the image of the adjustment pattern of the adjustment sheet 80a (the first adjustment sheet) is read, in order to cause the fold line (the area including the fold line) to appear as white color in the image of the adjustment pattern, it may be better for the image reader 14 to receive the specular reflection light. In other words, it may be considered better to read the image of the adjustment pattern with "landscape placement" applied to the adjustment sheet 80a (the first adjustment sheet) because the fold line (the area including the fold line) appears as while color in the image of the adjustment pattern. However, when the folded adjustment sheet 80a is placed on the platen PG with unfolded, the fold line is largely floated, and when the image reader 14 receives the specular reflection light on the fold line, the white color of the fold line (the area including the fold line) or the surroundings of the white color appear indistinctly in the image of the adjustment pattern. That is, noise often occurs in the white color of the fold line (the area including the fold line) or the surroundings of the white color in the image of the adjustment pattern. In contrast, in the folded adjustment sheet 80a, the toner on the fold line portion is separated, and thus even if the image reader 14 does not receive specular reflection light, the white color of the fold line (the area including the fold line) sufficiently appears in the image of the adjustment pattern. On the contrary, when the image reader 14 does not receive the specular reflection light, the white color of the fold line distinctly appears in the image of the adjustment pattern. Thus, in this exemplary embodiment, "portrait placement" is applied to the adjustment sheet 80a (the first adjustment sheet) on the platen PG. FIG. 14 is a table that summarizes the characteristics of the folded adjustment sheet 80a (the first adjustment sheet), a state of the adjustment sheet 80a when placed on the platen PG, and a placement manner of the adjustment sheet 80a on the platen PG all described above. The "adjustment sheet having a crease formed" illustrated in FIG. 14 will be described later.

Figure 15:
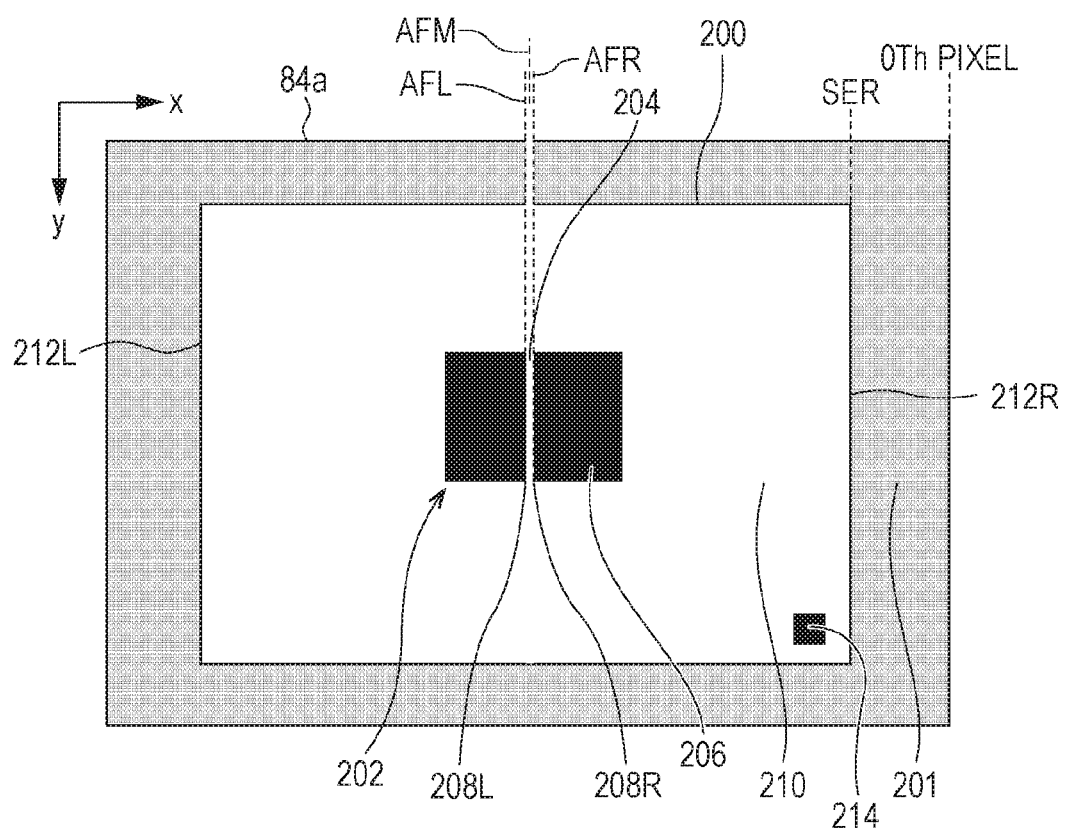
FIG. 15 illustrates an image after the image of the adjustment pattern of FIG. 10 is rotated 90 degrees clockwise.

Returning to FIG. 5, description of the flow of the adjustment processing is continued. In S110, the controller 68 functions as the position identifying unit 74, and identifies the position of the fold line (fold line position) based on the fold line which appears in the image of the adjustment pattern. FIG. 15 illustrates an image after the image of the adjustment pattern of FIG. 10 is rotated 90 degrees clockwise. The position identifying unit 74 of the controller 68 identifies the fold line position from the image of the adjustment pattern of FIG. 15, for instance, as described below.

As illustrated in FIG. 15, change portions 208L, 208R are present in the crosswise direction (the x-axis direction), in which color changes from black color of the adjustment pattern 206 (or a color with a high density) to white color (or a color with a low density) which indicates an area of the fold line. The area 204 including the fold line is between the change portion 208L and the change portion 208R. In other words, the area 204 including the fold line is the area in which the density significantly reduces in a crossing direction (the x-axis direction of FIG. 15 or a direction nearly parallel to the x-axis direction) crossing the direction (the vertical direction of FIG. 15 (the y-axis direction) or a direction nearly parallel to the vertical direction) along the fold of the adjustment sheet. The position specifying unit 74 of the controller 68 identifies a predetermined position of the area in which the density significantly reduces in the crossing direction, as the position of the fold line.

Although it is assumed in the above description that the area 204 including a fold line is present, in other words, a fold line having a width is present, a situation may occur in which a fold line having a width does not appear. In this case, the position specifying unit 74 of the controller 68 identifies the "position" at which the density significantly reduces, as the position of the fold line.

Next, an example of an identification method for the position of a fold line will be described. Change portions 212L, 212R are present in the crosswise direction (the x-axis direction) of FIG. 15, in which color changes from black color of the outside area 201 of the adjustment sheet 200 (or a color with a high density) to white color (or a color with a low density) of an inside area 210 of the adjustment sheet 200. The controller 68 can identify the positions of the change portions 212L, 212R, for instance, by a publicly known pattern matching in related art. Similarly, the positions of the change portions 208L, 208R of the above-described area 204 including a fold line can be identified. It is to be noted that the position herein indicates a pixel position in the crosswise direction (the x-axis direction) of FIG. 15.

In the example described here, the pixel position of the change portion 212L on the side (the left side) on which the reference edge mark 214 is not present in the crosswise direction (the x-axis direction) of the adjustment sheet 200 is not identified. In other words, the pixel position of the change portion 212R on the side (the right side) on which the reference edge mark 214 is present in the crosswise direction (the x-axis direction) of the adjustment sheet is identified, and the position of the fold line is identified based on the pixel position. In this exemplary embodiment, due to the presence of the reference edge mark 214, the edge serving as the reference (the reference edge) in the x-axis direction of the adjustment sheet is clear.

The identification of the pixel positions of the change portions 212R, 208L, and 208R by pattern matching is made in the following manner: for instance, 2×1 pixel pattern as illustrated in FIGS. 16A and 16B is scanned on the image of the adjustment pattern, and the positions, at which the condition of 2×1 pixel pattern is satisfied, are identified as the change portions 212R, 208L, and 208R. For instance, when each pixel value of the image 84a of the adjustment pattern has a value of one of 0 (black) to 255 (white), the pixel positions of the change portions 212R, 208R are identified by scanning the pattern illustrated in FIG. 16A in the x-axis direction of FIG. 15. Also, the pixel position of the change portion 208L is identified by scanning the pattern illustrated in FIG. 16B in the x-axis direction of FIG. 15. It is to be noted that the scanning may be performed at multiple positions in the vertical direction (the y-axis direction) of FIG. 15, and an average value of multiple pixel positions (multiple pixel positions in the x-axis direction for a change portion) obtained by the scanning may be set to the pixel position of the change portion. Alternatively, an approximation line (an approximation line extending in the y-axis direction) approximated by the least square method may be determined from multiple pixel positions, and the pixel position of the change portion may be determined based on the approximation line. It is to be noted that as illustrated in FIG. 15, the pixel position is determined so that the position at the right edge of the image 84a of the adjustment pattern is the 0th pixel. This is because the right side on which the reference edge mark 214 is present serves as a reference. FIG. 15 illustrates SER as the pixel position of the change portion 212R, AFR as the pixel position of the change portion 208R, and AFL as the pixel position of the change portion 208L.

Next, as illustrated in FIG. 15, pixel position AFM between (in the middle of) the pixel position AFR of the change portion 208R and the pixel position AFL of the change portion 208L is determined. The pixel position AFM is also the pixel position when the position at the right edge of the image 84a of the adjustment pattern is assumed to be the 0th pixel. Next, the position of the pixel position AFM is calculated when the change portion 212R serves as a reference edge, in other words, when the pixel position SER of the change portion 212R is assumed to be the 0th pixel. This can be calculated by subtracting the pixel position SER from the pixel position AFM. FIG. 17 illustrates the position (pixel position) as AF. The AF indicates the position of the identified fold line. It is to be noted that the change portion 212R is also referred to as the reference edge 212R. The reference edge 212R is the right edge of the adjustment sheet, and is the edge of the side on which the reference edge mark 214 is present.

Returning to FIG. 4, description of the flow of the adjustment processing is continued. In S112 subsequent to S110, the controller 68 obtains the difference between the position of the fold line (the fold line position) and the reference fold position. The memory 70 stores the pixel position RF of the reference fold position with respect to the reference edge 212R. FIG. 10 illustrates an example of the pixel position RF of the reference fold position. The controller 68 calculates the differential number α of pixels between the pixel position AF of the position of the fold line and the pixel position RF of the reference fold position. The product of the differential number α of pixels and a distance D1 (mm) per pixel corresponds to the displacement amount of the fold position.

Next, in S114 of FIG. 5, the controller 68 functions as the position adjusting unit 76, and sets an adjustment amount for the position of the fold line based on the differential number α of pixels between the pixel position AF of the position of the fold line and the pixel position RF of the reference fold position. The memory 70 pre-stores the distance D1 (mm) per pixel. As illustrated in FIG. 11, when the position AF of the identified fold line is on the left side of the reference fold position RF which is expected be the position of the fold line (when the differential number α of pixels is a positive value), an amount adjustments is set so that the position of the fold line is moved to the right side (closer to the reference edge 212R) and matches the reference fold position RF. On the other hand, when the position AF of the identified fold line is on the right side of the reference fold position RF which is expected be the position of the fold line (when the differential number α of pixels is a negative value), an amount adjustments is set so that the position of the fold line is moved to the left side (away from the reference edge 212R) and matches the reference fold position RF. The absolute value of the adjustment amount is the product of the differential number α of pixels and the distance D per pixel. The calculated adjustment amount stored in the memory 70 in association with the type of paper and the fold pattern (set in FIGS. 6B and 6C). The adjustment amount is used when a user issues an instruction for fold processing on the recording paper via the UI 72 or the PC in a normal time.

The above-described flow of FIG. 5 is performed for each type of paper and for each fold pattern, and an adjustment amount corresponding to the type and fold pattern is stored in the memory 70. When a user issues an instruction for fold processing on the recording paper via the UI 72 or the PC, an adjustment amount corresponding to the set type of paper and fold pattern is read from the memory 70, and the fold position of the fold unit 18 is adjusted by the adjustment amount. In this manner, the controller 68 (the position adjusting unit 76) adjusts the fold position of the fold unit 18 based on the difference between the position of the identified fold line (the fold line position) of the adjustment sheet and the reference fold position. It is to be noted that adjustment of the fold position is made, for instance, by adjusting the gate 62 of the mechanism of the fold unit 18 illustrated in FIGS. 2A and 2B.

By the above-described fold position adjustment processing of the image processing device 10 in this exemplary embodiment, fold position adjustment can be made more simply, as compared with the case where a displacement amount of the fold position is manually measured and fold position adjustment is made. In addition, in the above-described fold position adjustment processing, "portrait placement" is applied to the adjustment sheet (the first adjustment sheet) on the platen PG, specifically, the adjustment sheet is relatively scanned by the scanner of the image reader 14 in the direction along the fold line, and the image of the adjustment pattern is read. In this manner, the fold line clearly (distinctly) appears in the image of the adjustment pattern, the position of the fold line is accurately identified, and thus the fold position adjustment can be performed with high accuracy.

In the above-described fold position adjustment processing, description is given using half fold having one fold line in the recording paper as an example. However, needless to say, inner triple fold and Z fold having two or more fold lines in the recording paper may be selected. In this case, an adjustment pattern is printed at each of multiple fold positions of one adjustment sheet. For each of multiple fold positions of one adjustment sheet, the difference (displacement amount) between the fold position and the reference fold position is determined, and an adjustment amount for the fold position is obtained. In other words, when a fold pattern has two or more fold lines in the recording paper, adjustment amounts for multiple fold positions are obtained by one adjustment sheet.

<Crease Position Adjustment Processing>

Next, the crease position adjustment processing will be described. The crease position adjustment processing significantly differs from the fold position adjustment processing in that the position of a crease is adjusted by the crease former 19, and the image of the adjustment pattern is read with the adjustment sheet having a crease formed in the "landscape placement" on the platen PG. Since many points are common with the fold position adjustment processing, description duplicating with that of the fold position adjustment processing will be omitted as appropriate.

Figure 18:
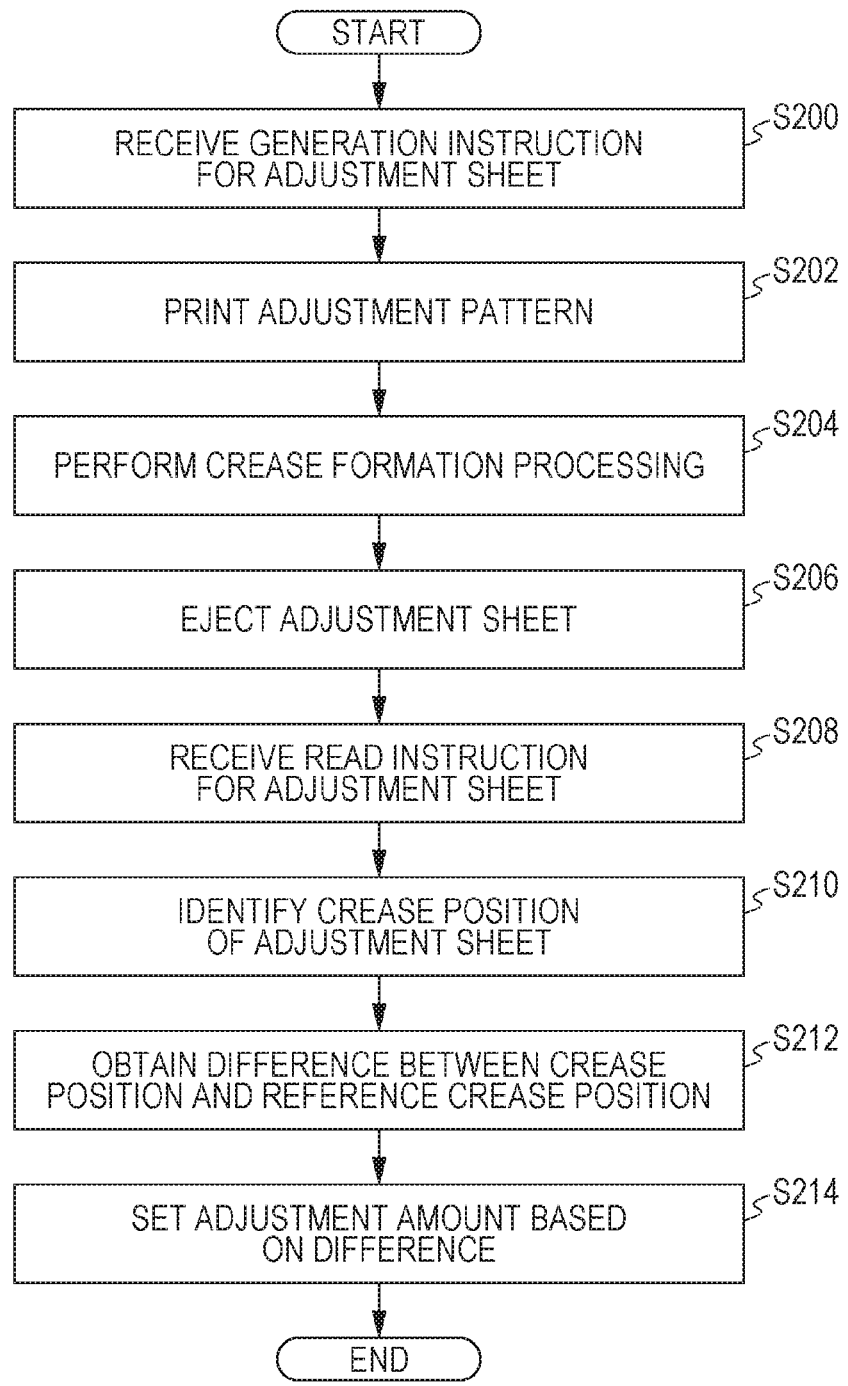
FIG. 18 is a flowchart illustrating the flow of the crease position adjustment processing of the image processing device.

FIG. 18 is a flowchart illustrating the flow of the crease position adjustment processing of the image processing device 10. In this exemplary embodiment, the crease position adjustment processing is performed by executing the flow of FIG. 18 for each of the types of recording paper.

First, in S200, the controller 68 receives a generation instruction for an adjustment sheet (a second adjustment sheet) via the UI 72. At this point, the screen displayed on the UI 72 is, for instance, FIGS. 6A to 6C similarly to the fold position adjustment processing. First, a selection screen for adjustment item illustrated in FIG. 6A is displayed, and "finisher adjustment" is selected by a user, for instance. Next, a selection screen for "fold pattern" or "crease" to be adjusted illustrated in FIG. 6B is displayed, and "crease" is selected by a user. Next, a selection screen for recording paper (paper) illustrated in FIG. 6C is displayed, and recording paper to be adjusted is selected by a user. When the "start to generate adjustment sheet" button illustrated in FIG. 6C is touched, a generation instruction for an adjustment sheet is received. Thus, the controller 68 controls the image former 12 so that the recording paper is supplied from the paper tray 26 which stores the recording paper (paper) selected in FIG. 6C, and the recording paper is delivered to the transport path 20. Alternatively, a user may place the recording paper selected in FIG. 5C in the bypass tray 30, and supply and deliver the recording paper from the bypass tray 30 to the transport path 20 by touching the "start to generate adjustment sheet" button. The supplied recording paper serves as an adjustment sheet (second adjustment sheet).

Figure 19A:
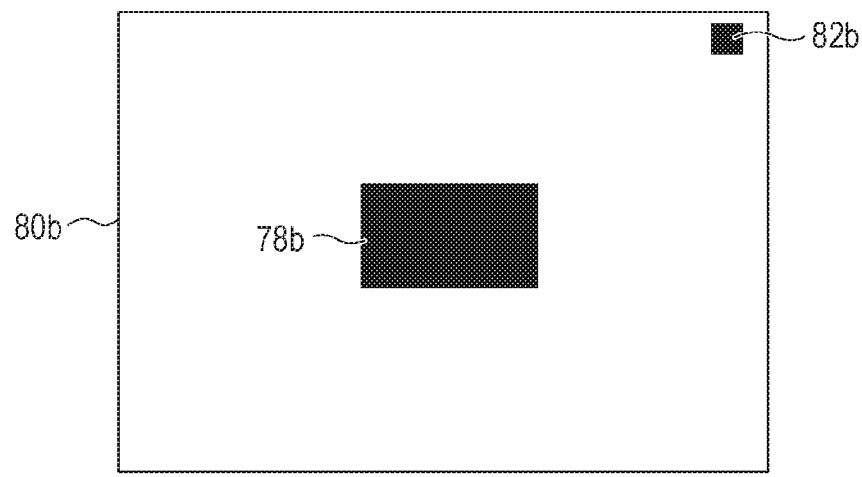
FIG. 19A illustrates an example of an adjustment sheet on which an adjustment pattern in the crease position adjustment processing is printed.

Next, in S202 of FIG. 18, the controller 68 controls the image former 12 so that a predetermined adjustment pattern is printed on the recording paper (adjustment sheet) supplied from the paper tray 26 or the bypass tray 30. FIG. 19A illustrates an example of an adjustment sheet 80*b* (second adjustment sheet) on which an adjustment pattern 78*b* is printed. Similarly to the fold position adjustment processing, the adjustment pattern 78*b* is a pattern (patch) that is filled with color at a fixed density, and is printed (formed) in at least part of the area in which a crease is formed by the crease former 19 of the post processor 16. About the position on the color of adjustment pattern 78*b*, a size, and adjustment sheet 80*b* of adjustment pattern 78*b*, the same as that of adjustment pattern 78*a* in adjustment processing of a fold position, and description is omitted. The color, the size of the adjustment pattern 78*b*, and the position of the adjustment pattern 78*b* on the adjustment sheet 80*b* are pre-stored in the memory 70, for instance. Similarly to the fold position adjustment processing, a reference edge mark 82*b* is printed in a corner area of the adjustment sheet 80*b*.

Figure 19B:
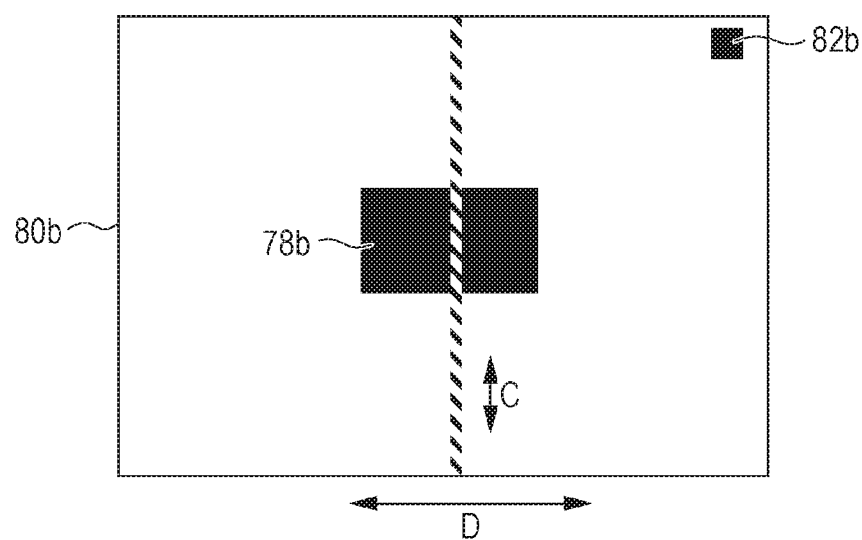
FIG. 19B illustrates an example of a state of the adjustment sheet on which crease formation processing is performed.

In S202 of FIG. 18, after the adjustment pattern is printed on the adjustment sheet, the adjustment sheet is delivered to the post processor 16. In S204, the controller 68 controls the crease former 19 so that crease formation processing is performed on the adjustment sheet. FIG. 19B illustrates an example of the adjustment sheet 80*b* in which a crease is formed. The position at which a crease is formed is illustrated by oblique lines in FIG. 19B. The position of the crease of the adjustment sheet 80*b* is pre-stored as a reference crease position in the memory 70, for instance. In other words, the reference crease position is a predetermined crease position. Although the crease former 19 performs crease formation processing on the adjustment sheet 80*b* in accordance with the reference crease position, an actual crease formed position may deviate from the reference crease position. Here, the crease former 19 forms a crease across the adjustment pattern 78*b*. It is to be noted that as illustrated in FIG. 19B, a reference edge mark 82*b* indicates an edge as a reference in a direction (crossing direction) D which crosses the direction C along the crease of the adjustment sheet 80*b*.

Figure 20:
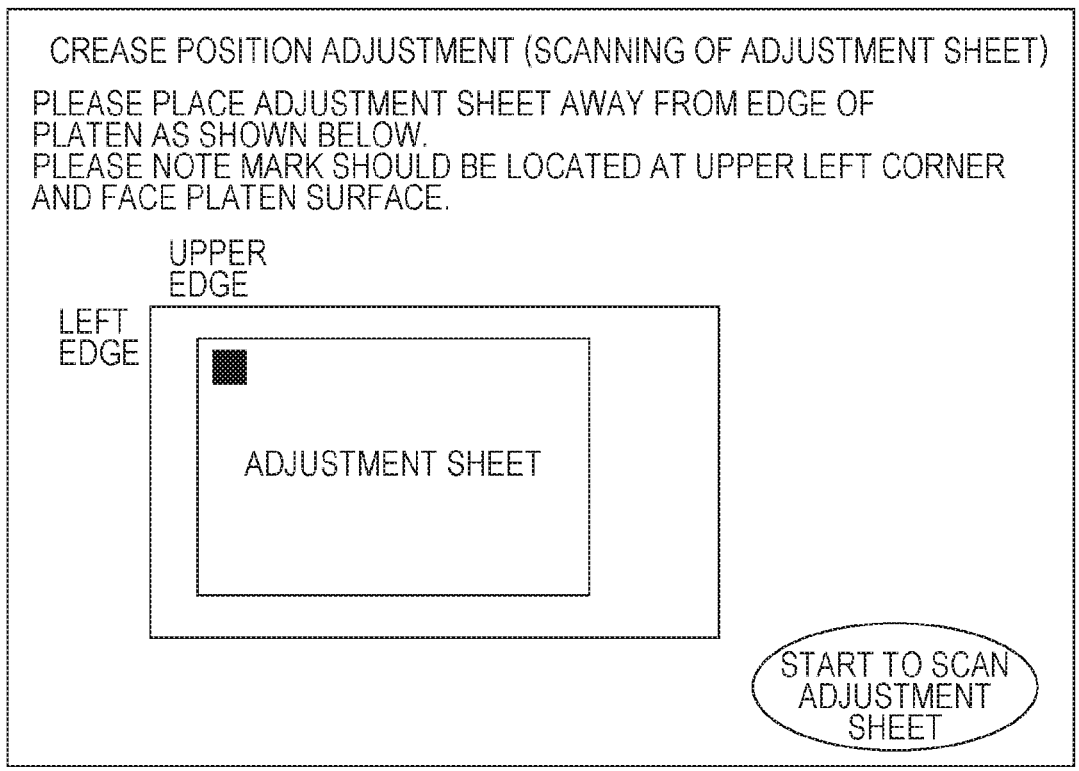
FIG. 20 illustrates an example of a guide screen when an adjustment sheet in the crease position adjustment processing is placed on the platen glass.

Next, in S206 of FIG. 18, the controller 68 discharges the adjustment sheet having a crease formed by the crease former 19 to the discharge tray 58. A user then places the adjustment sheet (the adjustment sheet having a crease formed) discharged to the discharge tray 58 on the platen glass PG at an upper portion of the image reader 14. FIG. 20 is an example of a guide screen for placing an adjustment sheet displayed on the UI 72, on the platen glass PG. Similarly to the fold position adjustment processing, as illustrated in FIG. 20, the UI 72 displays guidance indicating that an adjustment sheet should be placed away from the edge of the platen glass PG (platen PG). Also, guidance is displayed, which indicates that the reference edge mark (■ mark) printed in a corner area of the adjustment sheet should be located at an upper left corner, and the side of the adjustment sheet, on which the reference edge mark (and the adjustment pattern) are printed, should face the platen glass PG surface. A user places the adjustment sheet on the platen glass PG in accordance with the guidance.

Figure 21:
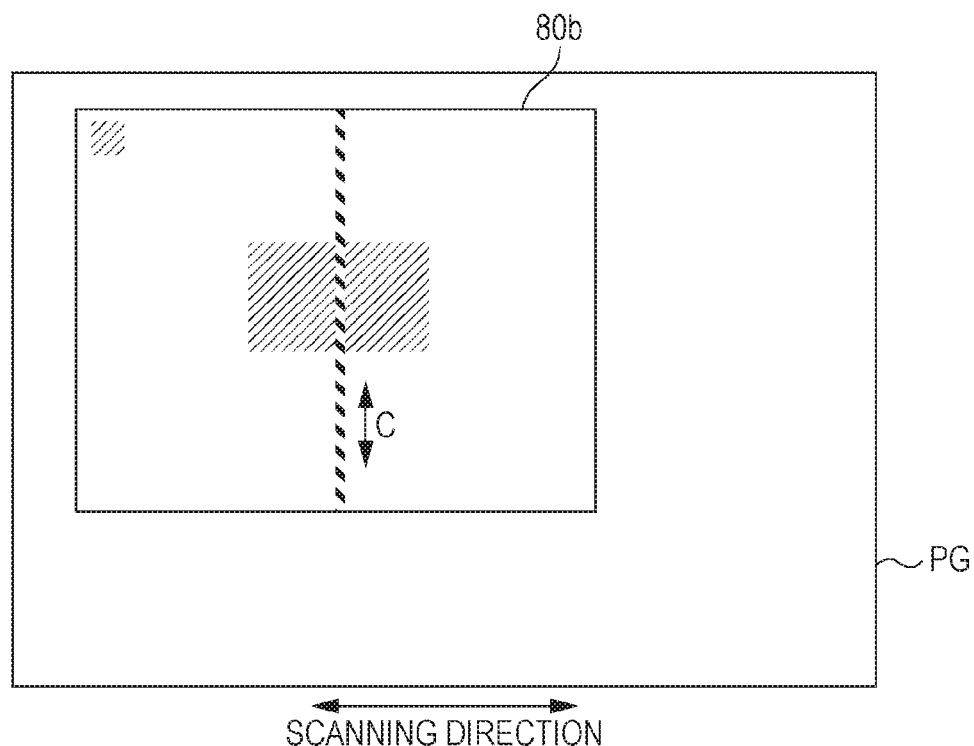
FIG. 21 illustrates a state where an adjustment sheet is placed on the platen glass in the crease position adjustment processing.

FIG. 21 is a top view of the adjustment sheet 80b (the second adjustment sheet) which is placed on the platen PG. Since the adjustment sheet 80b is placed such that the side thereof, on which the reference edge mark and the adjustment pattern are printed, faces the platen PG in FIG. 21, the reference edge mark and the adjustment pattern are not seen. However, in order to clarify those positions, the positions are illustrated by thin lines. In FIG. 21, the scanning direction of the exposure optical system 50 (scanner) of the image reader 14 is also illustrated. As illustrated in FIG. 21, unlike the fold position adjustment processing, in the crease position adjustment processing, the adjustment sheet 80b (the second adjustment sheet) is placed on the platen PG so that the image of the adjustment pattern of the adjustment sheet 80b is read by scanning the adjustment sheet 80 with the scanner of the image reader 14 in a direction (crossing direction) which crosses the direction C along the crease (oblique lines of FIG. 21). In short, "landscape placement" is applied to the adjustment sheet 80b on the platen PG.

Next, in S208 of FIG. 18, the controller 68 receives a read instruction for adjustment sheet via the UI 72. Specifically, when the "start to scan adjustment sheet" button illustrated in FIG. 20 is touched, a read instruction for adjustment sheet is received. The controller 68 controls the image reader 14 so that an image on the adjustment sheet is read. Specifically, the exposure optical system 50 of the image reader 14 moves to scan the adjustment sheet, thereby reading an image on the adjustment sheet. In this manner, the image reader 14 reads the image of the adjustment pattern of the adjustment sheet having a crease formed by the crease former 19.

Figure 22:
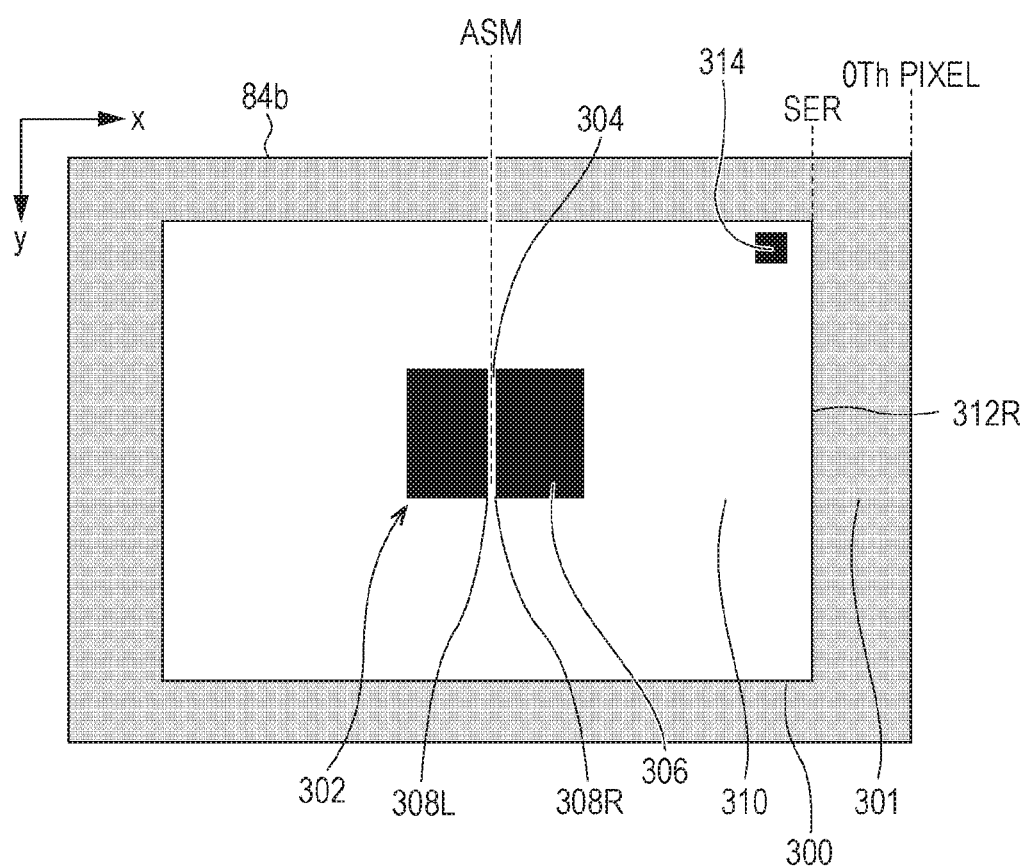
FIG. 22 illustrates an example of an image of an adjustment pattern of an adjustment sheet which is read in the crease position adjustment processing.

FIG. 22 illustrates an example of an image 84b of a read adjustment pattern. Similarly to the fold position adjustment processing, when the image of the read adjustment pattern is a color image, the adjustment pattern may be converted from a color image into a monochrome image by a publicly known method in related art. FIG. 22 illustrates an image after the conversion. Similarly to the fold position adjustment processing, as illustrated in FIG. 22, since the adjustment sheet is placed away from the edge of the platen glass PG, the image 84b of the adjustment pattern includes an outside area 301 of an adjustment sheet 300. In other words, the outer area (edge portion) of the adjustment sheet appears in the image 84b of the adjustment pattern.

Similarly to the fold position adjustment processing, in the image 84b of the adjustment pattern, an area 304 including a crease appears as white color or a color with a low density in an area 302 of the adjustment pattern. The controller 68 identifies the position of the crease in the adjustment sheet by identifying the position of white color appearing in the image 84b of the adjustment pattern or a color with a low density.

In this exemplary embodiment, the adjustment sheet has such a feature that when the image of the adjustment pattern is read with the "landscape placement" applied to the adjustment sheet (the second adjustment sheet) on the platen PG, in the image of the adjustment pattern, the area 304 including a crease in the area 302 of the adjustment pattern appears clearly. Specifically, in FIG. 22, the adjustment sheet has such a feature that in black color (or a color with a high density) of the area 302 of the adjustment pattern, white color (or a color with a low density) of the area 304 including a crease appears clearly.

As illustrated in FIG. 14, unlike the folded adjustment sheet (the first adjustment sheet), in the adjustment sheet (the second adjustment sheet) having a crease formed, toner is not separated from the portion of the crease. Even if toner is separated, the amount of separated toner is extremely little. Thus, it is not possible to cause the white color of a crease (an area including a crease) to appear in the image of the adjustment pattern due to the factor of separation of toner. Meanwhile, as described with reference to FIGS. 13A and 13B, when "landscape placement" is applied to the adjustment sheet (recording paper) on the platen PG, in other words, when the image of the adjustment pattern is read by scanning the adjustment sheet with the scanner of the image reader 14 in a direction (crossing direction) which crosses the direction along a crease (or a fold line), the angle of specular reflection light changes at a portion where the adjustment sheet is floated from the platen PG, and the specular reflection light is inputted into the CCD 56. Therefore, it is not possible to cause the white color of a crease (an area including a fold crease) to appear in the image of the adjustment pattern due to the factor of the specular reflection light. In particular, unlike the folded adjustment sheet (the first adjustment sheet), when the adjustment sheet (the second adjustment sheet) having a crease formed is placed on the platen PG, float from the platen PG (float at a crease) is small, and thus the white color of a crease (an area including a fold crease) does not appear blurred in the image of the adjustment pattern. Thus, in this exemplary embodiment, "landscape placement" is applied to the adjustment sheet 80b (the second adjustment sheet) on the platen PG. Consequently, a crease (the area including a crease) appears distinctly in the image of the adjustment pattern.

Returning to FIG. 18, in S210, the controller 68 functions as the position specifying unit 74, and identifies the position of a crease based on the crease which appears in the image of the adjustment pattern. An identification method for the position of a crease is the same as the identification method for the position of a fold line.

Specifically, the position of a crease is identified by the following manner. As illustrated in FIG. 22, change portions 308L, 308R are present in the crosswise direction (the x-axis direction), in which color changes from black color of an adjustment pattern 306 (or a color with a high density) to white color (or a color with a low density) which indicates an area of a crease. The area 304 including the crease is between the change portion 308L and the change portion 308R. In other words, the area 304 including the crease is the area in which the density significantly reduces in a crossing direction (the x-axis direction of FIG. 22 or a direction nearly parallel to the x-axis direction) which crosses the direction (the vertical direction of FIG. 22 (the y-axis direction) or a direction nearly parallel to the vertical direction) along the crease of the adjustment sheet. The position specifying unit 74 of the controller 68 identifies a predetermined position of the area in which the density significantly reduces in the crossing direction, as the position of the crease.

Although it is assumed in the above description that the area 304 including a crease is present, in other words, a crease having a width is present, a situation may occur in which a crease having a width does not appear. In this case, the position specifying unit 74 of the controller 68 identifies the "position" at which the density significantly reduces, as the position of the crease.

The identification method for the position of a crease is the same as the identification method for the position of a fold line, thus will be described in a simplified manner in the following. First, a central pixel position ASM of the area 304 including a crease in the x-axis direction of FIG. 22 is determined. The pixel position ASM is the pixel position when the position at the right edge of the image 84b of the adjustment pattern is assumed to be the 0th pixel. This is because a reference edge mark 314 is present on the right side. The pixel position AFM of the change portions 312R is then determined, in which color changes from black color (or a color with a high density) of the outside area 301 of the adjustment sheet 300 to white color (or a color with a low density) of an inside area 310 of the adjustment sheet 300. The pixel position SER is also the pixel position when the position at the right edge of the image 84b of the adjustment pattern is assumed to be the 0th pixel.

Figure 23:
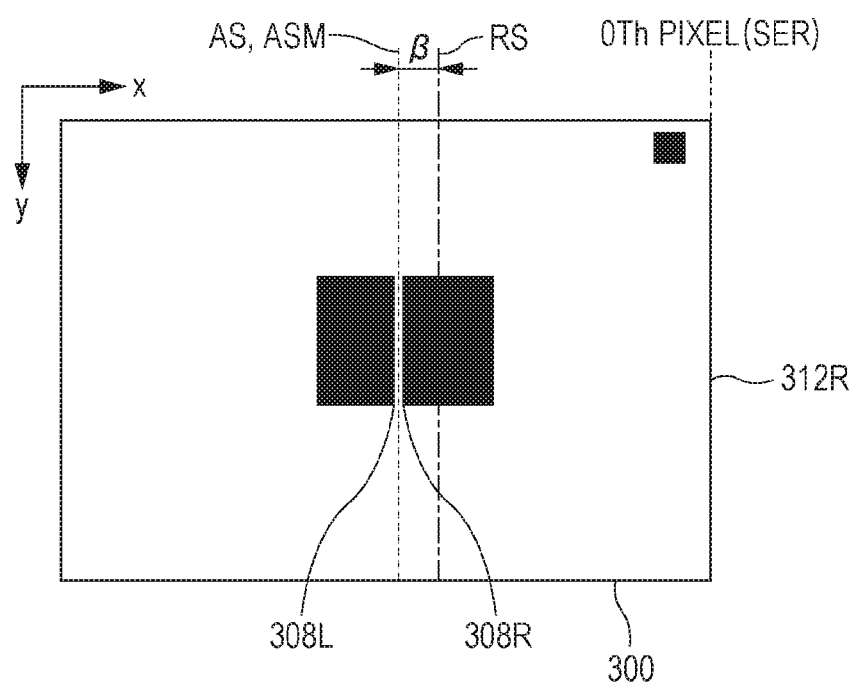
FIG. 23 is an explanatory diagram for the difference between a crease position and a reference fold position.

Next, the position of the pixel position ASM is calculated when the change portion 312R serves as a reference edge, in other words, when the pixel position SER of the change portion 312R is assumed to be the 0th pixel. This can be calculated by subtracting the pixel position SER from the pixel position ASM. FIG. 23 illustrates the position (pixel position) as AS. The AS indicates the position of the identified crease. It is to be noted that the change portion 312R is also referred to as the reference edge 312R. The reference edge 312R is the right edge of the adjustment sheet, and is the edge of the side on which the reference edge mark 314 is present.

Returning to FIG. 18, description of the flow of the adjustment processing is continued. In S212 subsequent to S210, the controller 68 obtains the difference between the position of the crease (the crease position) and the reference crease position. The memory 70 stores a pixel position RS of the reference crease position with respect to the reference edge 312R. FIG. 23 illustrates an example of the pixel position RS of the reference crease position. The controller 68 calculates the differential number β of pixels between the pixel position AS of the position of the crease and the pixel position RS of the reference crease position. The product of the differential number β of pixels and a distance D2 (mm) per pixel corresponds to the displacement amount of the crease position.

Next, in S214 of FIG. 18, the controller 68 functions as the position adjusting unit 76, and sets an adjustment amount for the position of the crease based on the differential number β of pixels between the pixel position AS of the position of the crease and the pixel position RF of the reference crease position. The memory 70 pre-stores the distance D2 (mm) per pixel. As illustrated in FIG. 23, when the position AS of the identified crease is on the left side of the reference crease position RS which is expected be the position of the crease (when the differential number β of pixels is a positive value), an amount adjustments is set so that the position of the crease is moved to the right side (closer to the reference edge 312R) and matches the reference crease position RS. On the other hand, when the position AS of the identified crease is on the right side of the reference crease position RS which is expected be the position of the crease (when the differential number β of pixels is a negative value), an amount adjustments is set so that the position of the crease is moved to the left side (away from the reference edge 312R) and matches the reference crease position RS. The absolute value of the adjustment amount is the product of the differential number β of pixels and the distance D2 per pixel. The calculated adjustment amount is stored in the memory 70 in association with the type of paper (set in FIG. 6C). The adjustment amount is used when a user issues an instruction for crease formation processing on the recording paper via the UI 72 or the PC in a normal time.

The above-described flow of FIG. 18 is performed for each type of paper, and an adjustment amount corresponding to the type is stored in the memory 70. When a user issues an instruction for crease formation processing on the recording paper via the UI 72 or the PC, an adjustment amount corresponding to the set type of paper is read from the memory 70, and the crease position of the crease former 19 is adjusted by the adjustment amount. In this manner, the controller 68 (the position adjusting unit 76) adjusts the crease position of the crease former 19 based on the difference between the position of the identified crease (the crease position) of the adjustment sheet and the reference crease position.

By the above-described crease position adjustment processing of the image processing device 10, crease position adjustment can be made more simply, as compared with the case where a displacement amount of the crease is manually measured and crease position adjustment is made. In addition, in the above-described crease position adjustment processing, "landscape placement" is applied to the adjustment sheet (the second adjustment sheet) on the platen PG, specifically, the adjustment sheet is relatively scanned by the scanner of the image reader 14 in a direction (crossing direction) which crosses the direction along the crease of the adjustment sheet, and the image of the adjustment pattern is read. In this manner, the crease clearly (distinctly) appears in the image of the adjustment pattern, the position of the crease is accurately identified, and thus the crease position adjustment can be performed with high accuracy.

In the above-described crease position adjustment processing, a crease is created in the recording paper. However, needless to say, two or more creases may be made in the recording paper. In this case, an adjustment pattern is printed at each of multiple crease positions of one adjustment sheet. For each of multiple crease positions of one adjustment sheet, the difference (displacement amount) between the crease position and the reference crease position is determined, and an adjustment amount for the crease position is obtained. In other words, when two or more creases are made in the recording paper, adjustment amounts for multiple crease positions are obtained by one adjustment sheet.

The above-described image processing device 10 may be called an image forming device. Also, the above-described "adjustment sheet" may be called a sheet for identifying the position of a fold line of the fold unit 18 that folds a sheet of paper, or called a sheet for identifying the position of a crease of the crease former 19 that forms a crease in a sheet of paper.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a fold unit that folds a first adjustment sheet, in which an adjustment pattern is formed, over the adjustment pattern based on a predetermined reference fold position;
an image reader that reads an image of the adjustment pattern of the first adjustment sheet with the first adjustment sheet folded by the fold unit unfolded;
a position identifying unit that, based on a fold line which appears in the image of the adjustment pattern read by the image reader, identifies a position of the fold line; and
a position adjusting unit that adjusts a fold position of the fold unit based on a difference between the position of the fold line identified by the position identifying unit and the reference fold position.

2. The image processing device according to claim 1, wherein the adjustment pattern of the first adjustment sheet is a pattern which is formed in at least part of an area in which the first adjustment sheet is folded, and is filled with color at a fixed density.

3. The image processing device according to claim 2, wherein the position identifying unit identifies a position or a predetermined position of an area in which a density significantly reduces in a direction crossing a direction along the fold of the first adjustment sheet, as the position of the fold line.

4. The image processing device according to claim 3, wherein the fold position of the fold unit is adjusted for each of types of paper by performing processing of each of the fold unit, the image reader, the position identifying unit, and the position adjusting unit on the first adjustment sheet for each of the types of paper.

5. The image processing device according to claim 4, wherein the fold position of the fold unit is adjusted for each of types of fold patterns by performing the processing of each of the fold unit, the image reader, the position identifying unit, and the position adjusting unit for each of the types of fold patterns.

6. The image processing device according to claim 3, wherein the fold position of the fold unit is adjusted for each of types of fold patterns by performing the processing of each of the fold unit, the image reader, the position identifying unit, and the position adjusting unit for each of the types of fold patterns.

7. The image processing device according to claim 2, wherein the fold position of the fold unit is adjusted for each of types of paper by performing processing of each of the fold unit, the image reader, the position identifying unit, and the position adjusting unit on the first adjustment sheet for each of the types of paper.

8. The image processing device according to claim 7, wherein the fold position of the fold unit is adjusted for each of types of fold patterns by performing the processing of each of the fold unit, the image reader, the position identifying unit, and the position adjusting unit for each of the types of fold patterns.

9. The image processing device according to claim 2, wherein the fold position of the fold unit is adjusted for each of types of fold patterns by performing the processing of each of the fold unit, the image reader, the position identifying unit, and the position adjusting unit for each of the types of fold patterns.

10. The image processing device according to claim 1, wherein the fold position of the fold unit is adjusted for each of types of paper by performing processing of each of the fold unit, the image reader, the position identifying unit, and the position adjusting unit on the first adjustment sheet for each of the types of paper.

11. The image processing device according to claim 10, wherein the fold position of the fold unit is adjusted for each of types of fold patterns by performing the processing of each of the fold unit, the image reader, the position identifying unit, and the position adjusting unit for each of the types of fold patterns.

12. The image processing device according to claim 1, wherein the fold position of the fold unit is adjusted for each of types of fold patterns by performing the processing of each of the fold unit, the image reader, the position identifying unit, and the position adjusting unit for each of the types of fold patterns.

13. The image processing device according to claim 1, wherein the image reader includes a scanner that scans the first adjustment sheet relatively in a direction along a fold of the first adjustment sheet, and reads the image of the adjustment pattern.

14. An image processing device comprising:
a crease former that forms a crease in an adjustment sheet, in which an adjustment pattern is formed, across the adjustment pattern based on a predetermined reference crease position;
an image reader that reads an image of the adjustment pattern of the adjustment sheet in which the crease is formed by the crease former;
a position identifying unit that identifies a position of the crease based on the crease which appears in the image of the adjustment pattern read by the image reader; and
a position adjusting unit that adjusts the position of the crease of the crease former based on a difference between the position of the crease identified by the position identifying unit and the reference crease position.

15. The image processing device according to claim 14, wherein the adjustment pattern of the adjustment sheet is a pattern which is formed in at least part of an area where the crease of the adjustment sheet is formed, and is filled with color at a fixed density.

16. The image processing device according to claim 15, wherein the position identifying unit identifies a position or a predetermined position of an area in which a density significantly reduces in a crossing direction which crosses a direction along the crease of the adjustment sheet, as the position of the crease.

17. The image processing device according to claim 16, wherein the position of the crease of the crease former is adjusted for each of types of paper by performing processing of each of the crease former, the image reader, the position identifying unit, and the position adjusting unit on the adjustment sheet for each of the types of paper.

18. The image processing device according to claim 15, wherein the position of the crease of the crease former is adjusted for each of types of paper by performing processing of each of the crease former, the image reader, the position identifying unit, and the position adjusting unit on the adjustment sheet for each of the types of paper.

19. The image processing device according to claim 14, wherein the position of the crease of the crease former is adjusted for each of types of paper by performing processing of each of the crease former, the image reader, the position identifying unit, and the position adjusting unit on the adjustment sheet for each of the types of paper.

20. A method comprising:
folding a first adjustment sheet, in which an adjustment pattern is formed, over the adjustment pattern based on a predetermined reference fold position;
reading an image of the adjustment pattern of the first adjustment sheet by relatively scanning the first adjustment portion along a direction along the fold of the first adjustment sheet with the folded first adjustment sheet unfolded;
based on a fold line which appears in the read image of the adjustment pattern, identifying a position of the fold line; and
adjusting a fold position in the folding based on a difference between the identified position of the fold line and the reference fold position.

* * * * *